US012647960B2

(12) United States Patent
Rodriguez Fernandez et al.

(10) Patent No.: US 12,647,960 B2
(45) Date of Patent: Jun. 2, 2026

(54) CARRIER AGGREGATION FOR UPLINK CELLS

(71) Applicant: QUALCOMM Incorporated, San Diego, CA (US)

(72) Inventors: Javier Rodriguez Fernandez, San Diego, CA (US); Kazuki Takeda, Minato-ku (JP)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 18/514,894

(22) Filed: Nov. 20, 2023

(65) Prior Publication Data

US 2025/0168837 A1      May 22, 2025

(51) Int. Cl.
*H04W 72/0457* (2023.01)
*H04W 56/00* (2009.01)
*H04W 72/1268* (2023.01)
*H04W 72/232* (2023.01)

(52) U.S. Cl.
CPC ... *H04W 72/0457* (2023.01); *H04W 56/0015* (2013.01); *H04W 72/1268* (2013.01); *H04W 72/232* (2023.01)

(58) Field of Classification Search
CPC ........... H04W 72/0457; H04W 72/232; H04W 56/0015; H04W 72/1268
See application file for complete search history.

(56) References Cited

U.S. PATENT DOCUMENTS

2021/0235492 A1 *  7/2021  Iyer ..................... H04W 74/006
2022/0124786 A1 *  4/2022  Mukherjee .............. H04L 5/001

* cited by examiner

*Primary Examiner* — Michael Thier
*Assistant Examiner* — Tracy Lauren Raimondo
(74) *Attorney, Agent, or Firm* — Holland & Hart LLP

(57)    ABSTRACT

Methods, systems, and devices for wireless communication are described. A user equipment (UE) may receive, for a first cell, first control signaling that indicates one or more bandwidth parts that are usable by the UE for uplink and downlink communication within the first cell. The one or more first bandwidth parts may be within a first carrier for carrier aggregation (CA) at the UE. Additionally, for a second cell, the UE may receive second control signaling that indicates a second bandwidth part that is usable by the UE for uplink communication within the second cell. The second bandwidth part may be within a second carrier for CA. The second control signaling may lack any indication of any bandwidth part that is usable by the UE for downlink communication within the second cell. The UE may monitor the first carrier for third control signaling associated with the second cell.

30 Claims, 14 Drawing Sheets

PDCCH <u>310</u>

405

415

420 First Configuration For DL+UL Cell (DL+UL Cell)

425 Second Configuration For UL-only Cell (DL+UL Cell or UL-only Cell)

430 Control Signaling For UL-only Cell (DL+UL Cell)

435 Scheduling Indication For UL-only Cell (DL+UL Cell or UL-only Cell)

Uplink Signaling (UL-only Cell)

440

Network Entity

400

130    105    115

Network
Entity

Transceiver

1210

Antenna

1215

Communications
Manager

1220

Memory

Code

1230

1225

1240

Processor

1235

1205

1200

Figure 13:
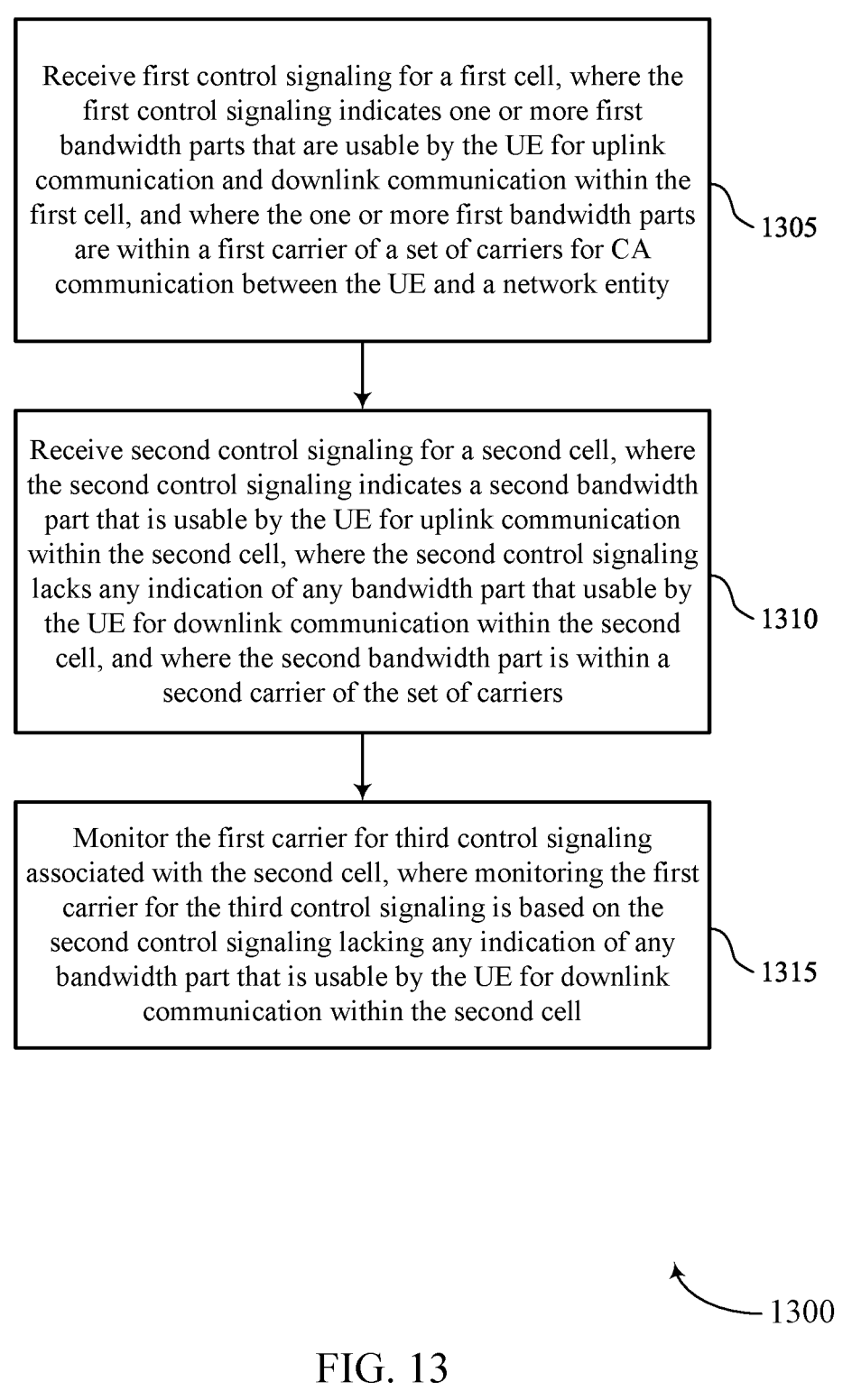

Receive first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and a network entity

1305

Receive second control signaling for a second cell, where the second control signaling indicates a second bandwidth part that is usable by the UE for uplink communication within the second cell, where the second control signaling lacks any indication of any bandwidth part that usable by the UE for downlink communication within the second cell, and where the second bandwidth part is within a second carrier of the set of carriers

1310

Monitor the first carrier for third control signaling associated with the second cell, where monitoring the first carrier for the third control signaling is based on the second control signaling lacking any indication of any bandwidth part that is usable by the UE for downlink communication within the second cell

Figure 14:
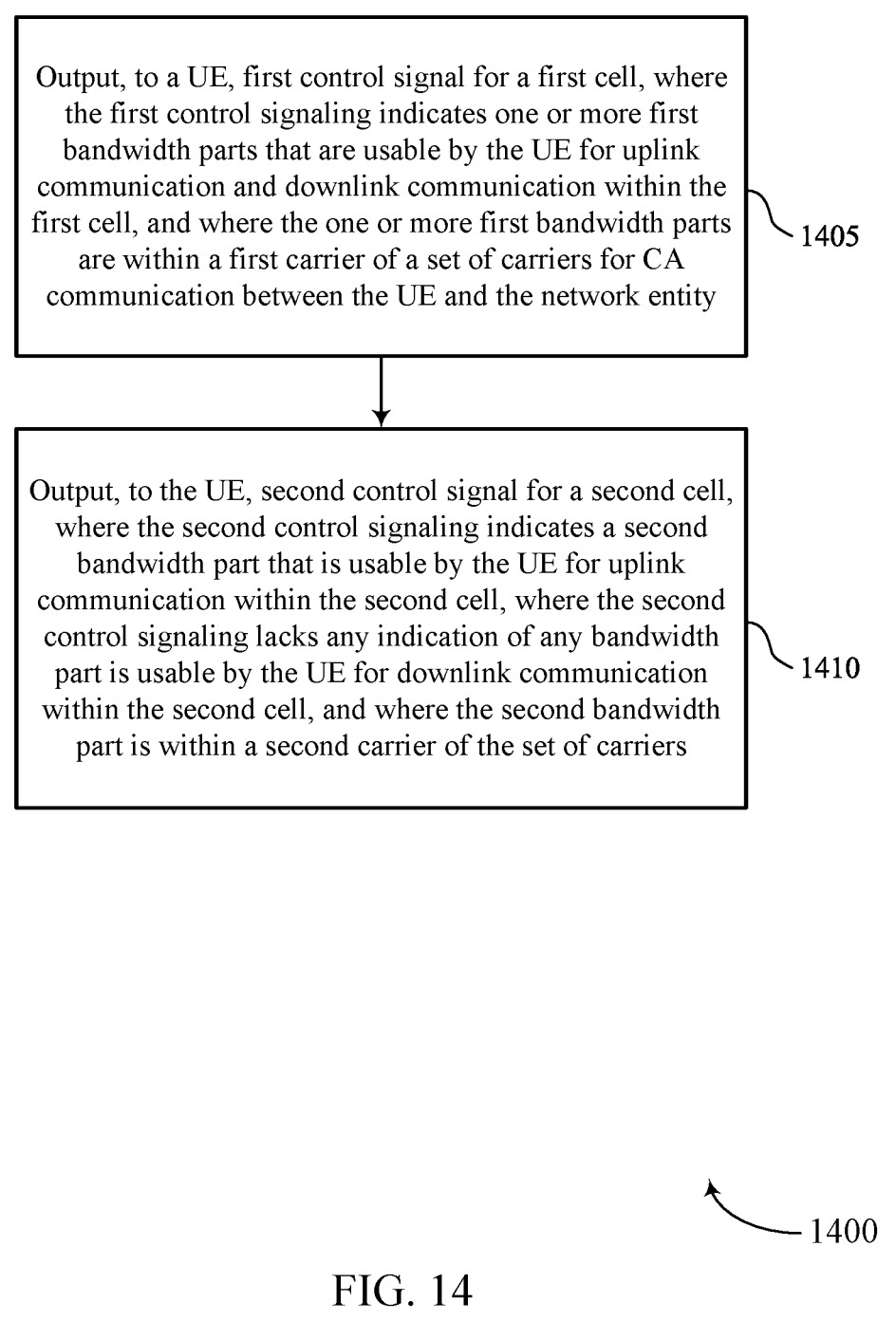

Output, to a UE, first control signal for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and the network entity ⟋ 1405

Output, to the UE, second control signal for a second cell, where the second control signaling indicates a second bandwidth part that is usable by the UE for uplink communication within the second cell, where the second control signaling lacks any indication of any bandwidth part is usable by the UE for downlink communication within the second cell, and where the second bandwidth part is within a second carrier of the set of carriers ⟋ 1410

CARRIER AGGREGATION FOR UPLINK CELLS

FIELD OF TECHNOLOGY

The following relates to wireless communication, including carrier aggregation (CA) for uplink cells.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE).

SUMMARY

The described techniques relate to improved methods, systems, devices, and apparatuses that support carrier aggregation (CA) for uplink (UL) cells. For example, the described techniques provide a framework for using UL-only cells to unify uplink CA (UL-CA) and supplementary uplink (SUL). In accordance with one or more techniques as described herein, a user equipment (UE) may receive first control signaling for a first cell. The first control signaling may indicate one or more first bandwidth parts that are usable by the UE for uplink communication and downlink communication within the first cell. For example, the first control signaling may indicate a first bandwidth part for uplink communication within the first cell and another first bandwidth part for downlink communication within the first cell. The one or more first bandwidth parts may be within a first carrier of a set of carriers for CA communication between the UE and a network entity. Additionally, the UE may receive second control signaling for a second cell. The second control signaling may indicate a second bandwidth part that is usable by the UE for uplink communication within the second cell. The second bandwidth part may be within a second carrier of the set of carriers. In some examples, the second control signaling may lack any indication of any bandwidth part that is usable by the UE for downlink communication within the second cell. As such, the second control signaling may indicate, to the UE, that the second cell is an UL-only cell. In such examples, the UE may monitor the first carrier for third control signaling associated with the second cell. For example, the UE may monitor the first carrier for the third control signaling based on the second control signaling lacking any indication of any bandwidth part that is usable by the UE for downlink communication within the second cell. That is, the UE may monitor the first carrier of the first cell for control signaling associated with the second cell based on the second cell being an UL-only cell.

A method for wireless communication by a UE is described. The method may include receiving first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and a network entity, receiving second control signaling for a second cell, where the second control signaling indicates a second bandwidth part that is usable by the UE for uplink communication within the second cell, where the second control signaling lacks any indication of any bandwidth part that usable by the UE for downlink communication within the second cell, and where the second bandwidth part is within a second carrier of the set of carriers, and monitoring the first carrier for third control signaling associated with the second cell, where monitoring the first carrier for the third control signaling is based on the second control signaling lacking any indication of any bandwidth part that is usable by the UE for downlink communication within the second cell.

A UE for wireless communication is described. The UE may include one or more memories storing processor executable code, and one or more processors coupled with the one or more memories. The one or more processors may individually or collectively be operable to execute the code to cause the UE to receive first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and a network entity, receive second control signaling for a second cell, where the second control signaling indicates a second bandwidth part that is usable by the UE for uplink communication within the second cell, where the second control signaling lacks any indication of any bandwidth part that usable by the UE for downlink communication within the second cell, and where the second bandwidth part is within a second carrier of the set of carriers, and monitor the first carrier for third control signaling associated with the second cell, where monitoring the first carrier for the third control signaling is based on the second control signaling lacking any indication of any bandwidth part that is usable by the UE for downlink communication within the second cell.

Another UE for wireless communication is described. The UE may include means for receiving first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and a network entity, means for receiving second control signaling for a second cell, where the second control signaling indicates a second bandwidth part that is usable by the UE for uplink communication within the second cell, where the second control signaling lacks any indication of any bandwidth part that usable by the UE for downlink communication within the second cell, and where the second bandwidth part is within a second carrier of the set of carriers, and means for monitoring the first carrier for third control signaling associated with the second cell, where monitoring the first carrier for the third control signaling is based on the second control signaling lacking any indication of any bandwidth part that is usable by the UE for downlink communication within the second cell.

A non-transitory computer-readable medium storing code for wireless communication is described. The code may include instructions executable by one or more processors to receive first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and a network entity, receive second control signaling for a second cell, where the second control signaling indicates a second bandwidth part that is usable by the UE for uplink communication within the second cell, where the second control signaling lacks any indication of any bandwidth part that usable by the UE for downlink communication within the second cell, and where the second bandwidth part is within a second carrier of the set of carriers, and monitor the first carrier for third control signaling associated with the second cell, where monitoring the first carrier for the third control signaling is based on the second control signaling lacking any indication of any bandwidth part that is usable by the UE for downlink communication within the second cell.

Some examples of the method, UEs, and non-transitory computer-readable medium described herein may further include operations, features, means, or instructions for monitoring one or more physical downlink control channel (PDCCH) candidates of a control resource set (CORESET) associated with the first cell, where monitoring the one or more PDCCH candidates may be based on the second control signaling lacking any indication of any bandwidth part that may be usable by the UE for downlink communication within the second cell and receiving, via the one or more PDCCH candidates, downlink control information (DCI) scheduling the UE to transmit uplink signaling via the second bandwidth part associated with the second cell.

Some examples of the method, UEs, and non-transitory computer-readable medium described herein may further include operations, features, means, or instructions for monitoring one or more PDCCH candidates of a CORESET associated with the second cell, where monitoring the one or more PDCCH candidates may be based on the second control signaling lacking any indication of any bandwidth part that usable by the UE for downlink communication and receiving, via the one or more PDCCH candidates, DCI scheduling the UE to transmit uplink signaling via the second bandwidth part associated with the second cell within the second cell.

Some examples of the method, UEs, and non-transitory computer-readable medium described herein may further include operations, features, means, or instructions for receiving, via the first carrier, the third control signaling associated with the second cell, where the third control signaling includes a radio resource control (RRC) message or a medium access control-control element (MAC-CE).

In some examples of the method, UEs, and non-transitory computer-readable medium described herein, the third control signaling indicates for the UE to activate or deactivate the second cell for CA communication between the UE and the network entity.

In some examples of the method, UEs, and non-transitory computer-readable medium described herein, the third control signaling indicates for the UE to release the second cell.

Some examples of the method, UEs, and non-transitory computer-readable medium described herein may further include operations, features, means, or instructions for receiving an indication that enables the second cell for uplink transmission switching in accordance with a first mode, the first mode associated with uplink transmissions via a single transmit chain and receiving the third control signaling via the first carrier, where the third control signaling schedules the UE to transmit uplink signaling via the second carrier in accordance with the first mode.

Some examples of the method, UEs, and non-transitory computer-readable medium described herein may further include operations, features, means, or instructions for receiving an indication that enables the second cell for uplink transmission switching in accordance with a second mode, the second mode associated with uplink transmissions via at least two transmit chains and receiving the third control signaling via the first carrier, where the third control signaling schedules the UE to simultaneously transmit uplink signaling via the first carrier and the second carrier in accordance with the second mode.

Some examples of the method, UEs, and non-transitory computer-readable medium described herein may further include operations, features, means, or instructions for receiving the third control signaling via the first carrier, where the third control signaling schedules a first time domain resource for the UE to transmit uplink signaling via the second carrier using frequency division duplexing (FDD) and receiving fourth control signaling via the first carrier, where the fourth control signaling schedules the first time domain resource for the UE to receive downlink signaling via the first carrier using the FDD.

Some examples of the method, UEs, and non-transitory computer-readable medium described herein may further include operations, features, means, or instructions for monitoring the second carrier for a set of synchronization signal blocks (SSBs) associated with the second carrier, where monitoring the second carrier for the set of SSBs may be based on the second control signaling lacking any indication of any bandwidth part that may be usable by the UE for downlink communication within the second cell and receiving, via the second carrier, at least one SSB of the set of SSBs.

Some examples of the method, UEs, and non-transitory computer-readable medium described herein may further include operations, features, means, or instructions for transmitting a report that may be indicative of one or more metrics associated with a quality of the second carrier, where the one or more metrics may be based on one or more measurements of the at least one SSB.

Some examples of the method, UEs, and non-transitory computer-readable medium described herein may further include operations, features, means, or instructions for receiving, via the first cell in response to the report, fourth control signaling that indicates a transmit power for uplink communication via the second carrier.

In some examples of the method, UEs, and non-transitory computer-readable medium described herein, the report may be transmitted via the first carrier or the second carrier.

In some examples of the method, UEs, and non-transitory computer-readable medium described herein, the one or more metrics include a timing position metric, or a pathloss metric, or both.

In some examples of the method, UEs, and non-transitory computer-readable medium described herein, receiving the second control signaling may include operations, features, means, or instructions for receiving, via the first carrier, an indication of one or more parameters associated with the set of SSBs, where monitoring for the set of SSBs associated with the second carrier may be in accordance with the one or more parameters.

In some examples of the method, UEs, and non-transitory computer-readable medium described herein, the one or more parameters include a position parameter that indicates a time domain position of one or more SSBs within the set of SSBs, a periodicity parameter that indicates a periodicity of one or more SSBs within the set of SSBs, a power parameter that indicates a transmit power associated with one or more SSBs within the set of SSBs, or a subcarrier spacing parameter that indicates a subcarrier spacing of one or more SSBs within the set of SSBs, or any combination thereof.

In some examples of the method, UEs, and non-transitory computer-readable medium described herein, receiving the second control signaling may include operations, features, means, or instructions for receiving, via the first carrier, an indication of a pattern associated with uplink communication via the second carrier using time division duplexing (TDD).

In some examples of the method, UEs, and non-transitory computer-readable medium described herein, receiving the second control signaling may include operations, features, means, or instructions for receiving the second control signaling via the first carrier or the second carrier, where the second control signaling includes a system information block (SIB).

In some examples of the method, UEs, and non-transitory computer-readable medium described herein, the second control signaling lacks any indication of any supplementary uplink (SUL) configuration that may be usable by the UE for uplink communication within the second cell.

A method for wireless communication by a network entity is described. The method may include outputting, to a UE, first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and the network entity and outputting, to the UE, second control signaling for a second cell, where the second control signaling indicates a second bandwidth part that is usable by the UE for uplink communication within the second cell, where the second control signaling lacks any indication of any bandwidth part is usable by the UE for downlink communication within the second cell, and where the second bandwidth part is within a second carrier of the set of carriers.

A network entity for wireless communication is described. The network entity may include one or more memories storing processor executable code, and one or more processors coupled with the one or more memories. The one or more processors may individually or collectively be operable to execute the code to cause the network entity to output, to a UE, first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and the network entity and output, to the UE, second control signaling for a second cell, where the second control signaling indicates a second bandwidth part that is usable by the UE for uplink communication within the second cell, where the second control signaling lacks any indication of any bandwidth part is usable by the UE for downlink communication within the second cell, and where the second bandwidth part is within a second carrier of the set of carriers.

Another network entity for wireless communication is described. The network entity may include means for outputting, to a UE, first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and the network entity and means for outputting, to the UE, second control signaling for a second cell, where the second control signaling indicates a second bandwidth part that is usable by the UE for uplink communication within the second cell, where the second control signaling lacks any indication of any bandwidth part is usable by the UE for downlink communication within the second cell, and where the second bandwidth part is within a second carrier of the set of carriers.

A non-transitory computer-readable medium storing code for wireless communication is described. The code may include instructions executable by one or more processors to output, to a UE, first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and the network entity and output, to the UE, second control signaling for a second cell, where the second control signaling indicates a second bandwidth part that is usable by the UE for uplink communication within the second cell, where the second control signaling lacks any indication of any bandwidth part is usable by the UE for downlink communication within the second cell, and where the second bandwidth part is within a second carrier of the set of carriers.

Some examples of the method, network entities, and non-transitory computer-readable medium described herein may further include operations, features, means, or instructions for outputting, to a second UE, third control signaling for the second cell, where the third control signaling indicates that the second bandwidth part may be usable by the second UE for uplink communication and downlink communication within the second cell.

Some examples of the method, network entities, and non-transitory computer-readable medium described herein may further include operations, features, means, or instructions for outputting, to the UE via the first cell and after outputting the second control signaling, third control signaling for the second cell, where the third control signaling indicates a change of the second bandwidth part from being usable by the UE for uplink communication to being usable by the UE for downlink communication, or indicates at least one additional bandwidth part that may be usable by the UE for downlink or uplink communications.

Some examples of the method, network entities, and non-transitory computer-readable medium described herein may further include operations, features, means, or instructions for outputting, via one or more PDCCH candidates associated with the first cell, DCI scheduling the UE to transmit uplink signaling via the second bandwidth part associated with the second cell, where outputting the DCI via the one or more PDCCH candidates may be based on the second control signaling lacking any indication of any bandwidth part that may be usable by the UE for downlink communication within the second cell.

Some examples of the method, network entities, and non-transitory computer-readable medium described herein may further include operations, features, means, or instructions for outputting, via one or more PDCCH candidates associated with the second cell, DCI scheduling the UE to transmit uplink signaling via the second bandwidth part associated with the second cell, where outputting the DCI via the one or more PDCCH candidates may be based on the second control signaling lacking any indication of any bandwidth part that may be usable by the UE for downlink communication within the second cell.

Some examples of the method, network entities, and non-transitory computer-readable medium described herein may further include operations, features, means, or instructions for outputting, via the first carrier, third control signaling associated with the second cell, where outputting the third control signaling via the first carrier may be based on the second control signaling lacking any indication of any bandwidth part that may be usable by the UE for downlink communication within the second cell.

In some examples of the method, network entities, and non-transitory computer-readable medium described herein, the third control signaling indicates for the UE to activate the second cell for CA communication between the UE and the network entity, to deactivate the second cell for CA communication between the UE and the network entity, or to release the second cell.

Some examples of the method, network entities, and non-transitory computer-readable medium described herein may further include operations, features, means, or instructions for outputting an indication that enables the second cell for uplink transmission switching in accordance with a first mode, the first mode associated with uplink transmissions via a single transmit chain and outputting third control signaling via the first carrier, where the third control signaling schedules the UE to transmit uplink signaling via the second carrier in accordance with the first mode.

Some examples of the method, network entities, and non-transitory computer-readable medium described herein may further include operations, features, means, or instructions for outputting an indication that enables the second cell for uplink transmission switching in accordance with a second mode, the second mode associated with uplink transmissions via at least two transmit chains and outputting third control signaling via the first carrier, where the third control signaling schedules the UE to simultaneously transmit uplink signaling via the first carrier and the second carrier in accordance with the second mode.

Some examples of the method, network entities, and non-transitory computer-readable medium described herein may further include operations, features, means, or instructions for outputting third control signaling via the first carrier, where the second control signaling schedules a first time domain resource for the UE to transmit uplink signaling via the second carrier using FDD and outputting fourth control signaling via the first carrier, where the fourth control signaling schedules the first time domain resource for the UE to receive downlink signaling via the first carrier using the FDD.

Some examples of the method, network entities, and non-transitory computer-readable medium described herein may further include operations, features, means, or instructions for outputting, via the second carrier, at least one SSB of a set of SSBs associated with the second carrier and obtaining a report associated with the second carrier, where the report may be indicative of one or more metrics associated with a quality of the second carrier, and where the one or more metrics may be based on one or more measurements of the at least one SSB.

Some examples of the method, network entities, and non-transitory computer-readable medium described herein may further include operations, features, means, or instructions for outputting, via the first cell in response to the report, fourth control signaling that indicates a transmit power for uplink communication via the second carrier.

In some examples of the method, network entities, and non-transitory computer-readable medium described herein, the report may be obtained via the first carrier or the second carrier.

In some examples of the method, network entities, and non-transitory computer-readable medium described herein, the one or more metrics include a timing position metric, or a pathloss metric, or both.

In some examples of the method, network entities, and non-transitory computer-readable medium described herein, outputting the second control signaling may include operations, features, means, or instructions for outputting, via the first carrier, an indication of one or more parameters associated with the set of SSBs, where outputting the at least one SSB associated with the second carrier may be in accordance with the one or more parameters.

In some examples of the method, network entities, and non-transitory computer-readable medium described herein, the one or more parameters include a position parameter that indicates a time domain position of one or more SSBs within the set of SSBs, a periodicity parameter that indicates a periodicity of one or more SSBs within the set of SSBs, a power parameter that indicates a transmit power associated with one or more SSBs within the set of SSBs, or a subcarrier spacing parameter that indicates a subcarrier spacing of one or more SSBs within the set of SSBs, or any combination thereof.

In some examples of the method, network entities, and non-transitory computer-readable medium described herein, outputting the second control signaling may include operations, features, means, or instructions for outputting, via the first carrier, an indication of a pattern associated with transmission of uplink signaling via the second carrier using TDD.

In some examples of the method, network entities, and non-transitory computer-readable medium described herein, outputting the second control signaling may include operations, features, means, or instructions for outputting the second control signaling via the first carrier or the second carrier, where the second control signaling includes a SIB.

In some examples of the method, network entities, and non-transitory computer-readable medium described herein, the second control signaling lacks any indication of any SUL configuration that may be usable by the UE for uplink communication within the second cell.

BRIEF DESCRIPTION OF THE DRAWINGS

FIGS. 13 and 14 show flowcharts illustrating methods that support CA for UL cells in accordance with one or more aspects of the present disclosure.

DETAILED DESCRIPTION

Figure 1:
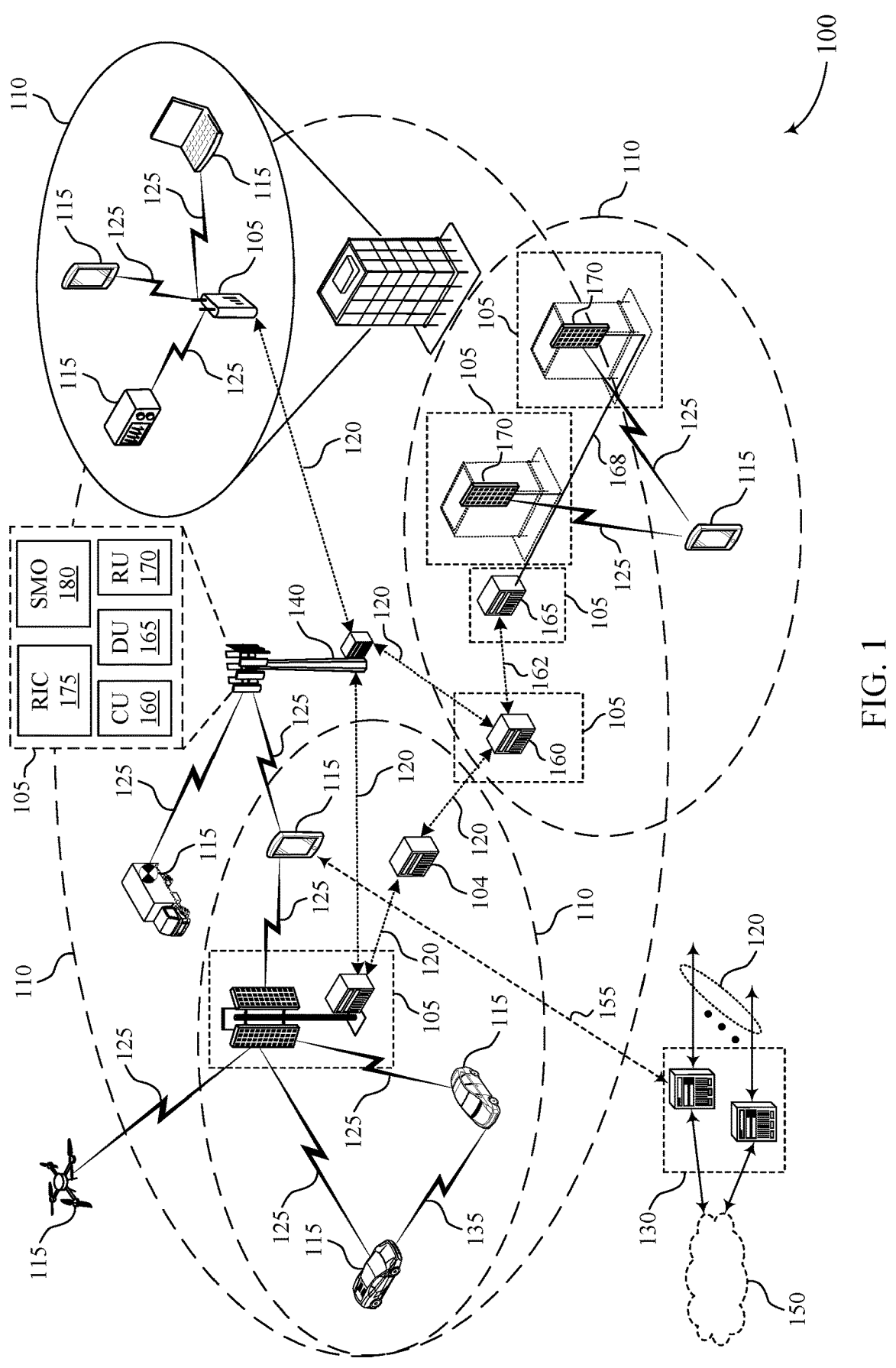
FIGS. 1, 2A, and 2B show wireless communications systems that support carrier aggregation (CA) for uplink (UL) cells in accordance with one or more aspects of the present disclosure.

A wireless communications system may include communication devices, such as a user equipment (UE) or one or more network entities. A communication device may support wireless communication over one or multiple radio frequency bands and one or multiple carriers. In some examples, the network (e.g., one or more network entities) may schedule the communication device with a single carrier or with multiple carriers to support wireless communication, for example, in the form of carrier aggregation (CA) or dual connectivity (DC). In some examples, to increase the data capacity of the wireless communications system, the network may configure the communication device to support CA over a single radio frequency band or multiple radio frequency bands (e.g., inter-band carrier aggregation). For example, the network may configure the communication device to aggregate two or more carriers across a same radio frequency band or between multiple (e.g., separate) radio frequency bands. Additionally, or alternatively, CA may increase throughput by providing the UE with diverse carriers for uplink signaling. That is, the UE may use carrier aggregation to simultaneously transmit uplink signaling on multiple carriers, thereby increasing uplink throughput. Additionally, or alternatively, the wireless communications system may support supplementary uplink (SUL). For example, the network may configure the UE with an SUL carrier to use for SUL. The SUL carrier may enable the UE to extend uplink coverage by providing the UE with an alternative carrier for uplink communication, for example, if a current carrier is in outage (e.g., lacks suitable connectivity with the network). That is, if channel condition of a carrier fall below a threshold, the UE may switch from the carrier to the SUL carrier.

One or more capabilities of the UE may be applicable to both SUL and CA. For example, the UE may support uplink transmission switching in which the UE may switch a transmit chain at the UE between multiple carriers. In some cases, however, the network may use multiple (e.g., separate) frameworks to configure the UE with SUL and CA. In other words, the network may configure (e.g., define and treat) SUL and CA separately. For example, to enable uplink transmission switching at the UE for SUL and CA, the network may transmit control signaling to enable uplink transmission switching at the UE for SUL and (separately) transmit other control signaling to enable uplink transmission switching at the UE for CA. As such, multiple (e.g., separate) frameworks for configuring the UE with SUL and CA may lead to increased overhead and inconsistencies at the UE or the network.

Various aspects of the present disclosure relate to techniques for CA using uplink-only (UL-only) cells and, more specifically, a framework for unifying uplink CA (UL-CA) and SUL. For example, in accordance with techniques as described herein, the network may configure a UE with multiple carriers for CA, in which each carrier may correspond to a respective cell (also referred to as a serving cell). The UE may receive a first serving cell configuration for a first cell of the multiple cells. The first serving cell configuration (e.g., first control signaling) may indicate, to the UE, that the first serving cell is associated with a first carrier for CA that is usable by the UE for uplink communication and downlink communication within the first cell. As such, the UE may determine that the first cell is a downlink and uplink (DL+UL) cell. Additionally, for at least a second cell, the UE may receive a second serving cell configuration (e.g., second control signaling) that indicates that the second serving cell is associated with a second carrier for CA that is usable by the UE for uplink communication (e.g., only uplink communication). That is, the second serving cell configuration may lack any indication of any bandwidth part of the second cell that is usable by the UE for downlink communication. As such, the UE may determine that the second cell is a UL-only cell. The UE may monitor the first carrier of the DL+UL cell for control signaling associated with the UL-only cell.

In some examples, such as examples in which a single transmit chain is enabled at the UE, the UE may use a first uplink transmission switching mode, referred to as switched uplink, to switch from using the first carrier for uplink transmissions to using the second carrier for uplink transmissions. In this way, the second carrier of the UL-only cell may serve as an SUL carrier. In some other examples, such as examples in which multiple transmit chains are enabled at the UE, the UE may use a second uplink transmission switching mode, referred to as dual uplink, to aggregate the first carrier and the second carrier for simultaneous uplink transmissions. In this way, the second carrier may serve as a component carrier for UL-CA. In other words, the UL-only cells may enable a single framework for configuring the UE for SUL and UL-CA. That is, the network may use one or more UL-only cells to unify UL-CA and SUL.

Particular aspects of the subject matter described herein may be implemented to realize one or more of the following potential advantages. For example, the techniques employed by the described communication devices may provide benefits and enhancements to wireless communication devices operating within a network, including enabling a framework for unifying CA (e.g., UL-CA) and SUL. In some examples, operations performed by the described communication devices may provide improvements to techniques for CA within the wireless communications system. The operations performed by the described communication devices to improve techniques for CA may include configuring a UE with UL-only cells. In some other implementations, operations performed by the described wireless communication devices may also support improvements to user experience and higher data rates, among other benefits.

Aspects of the disclosure are initially described in the context of wireless communications systems. Aspects of the disclosure are also described in the context of a cross-carrier scheduling diagram and a process flow. Aspects of the disclosure are further illustrated by and described with reference to apparatus diagrams, system diagrams, and flow-charts that relate to CA for UL cells.

FIG. 1 shows an example of a wireless communications system 100 that supports CA for UL cells in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be config-ured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communi-cate with the core network 130, or with one another, or both. For example, network entities 105 may communicate with the core network 130 via one or more backhaul communi-cation links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communica-tion link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul com-munication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be imple-mented in a disaggregated architecture (e.g., a disaggregated base station architecture, a disaggregated RAN architec-ture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestra-tion (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggre-gated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support CA for UL cells as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using CA or multi-carrier operation. A UE 115 may be configured with multiple downlink component carriers and one or more uplink component carriers according to a CA configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a CA configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a bandwidth part) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more bandwidth parts having the same or different numerologies. In some examples, a UE 115 may be configured with multiple bandwidth parts. In some examples, a single bandwidth part for a carrier may be active at a given time and communications for the UE 115 may be restricted to one or more active bandwidth parts.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a CA configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may support CA in which the UE 115 may aggregate two or more carriers across a same radio frequency band or between multiple (e.g., separate) radio frequency bands. Additionally, the wireless communications system 100 may support SUL, in which the UE 115 may switch from a carrier to a SUL carrier, for example, if channel condition of the carrier fall below a threshold. The network entity 105 may use multiple (e.g., separate) frameworks to configure the UE 115 with SUL and CA. In other words, the network may configure (e.g., define and treat) SUL and CA separately. In some cases, however, using multiple (e.g., separate) frameworks for configuring the UE 115 with SUL and CA may lead to increased overhead and inconsistencies at the UE 115 or the network entity 105.

In some examples, however, the network entity 105 (and the UE 115) may support a framework for unifying CA and SUL. For example, in accordance with one or more techniques as described herein, the network entity 105 may configure the UE 115 with multiple carriers for CA, in which each carrier may correspond to a respective cell (also referred to as a serving cell). The network entity 105 may transmit a first serving cell configuration to the UE 115. The first serving cell configuration may be for a first cell of the multiple cells. The first serving cell configuration (e.g., first control signaling) may indicate, to the UE 115, that the first serving cell is associated with a first carrier for CA, and that the first carrier is usable by the UE 115 for uplink communication and downlink communication within the first cell. As such, the UE 115 may determine that the first cell is a DL+UL cell. Additionally, the network entity 105 may transmit a second serving cell configuration to the UE 115 for at least a second cell. The second serving cell configuration (e.g., second control signaling) may indicate, to the UE 115, that the second serving cell is associated with a second carrier for CA, and that the second carrier is usable by the UE 115 for uplink communication (e.g., only uplink communication). The second serving cell configuration may lack any indication of any bandwidth part of the second cell that is usable by the UE 115 for downlink communication. As such, the UE 115 may determine that the second cell is a UL-only cell. The UE 115 may monitor the first carrier of the DL+UL cell for signaling, such as control signaling, that associated with the UL-only cell. That is, because the second carrier lacks a bandwidth part usable at the UE for downlink communication, the network entity 105 may transmit (and the UE 115 may monitor for) control signaling that is associated with UL-only on the DL+UL cell. In some examples, configuring the UE 115 with the UL-only cell may unify CA and SUL, which may lead to improved user experience and higher data rates, among other benefits.

Figure 2A:
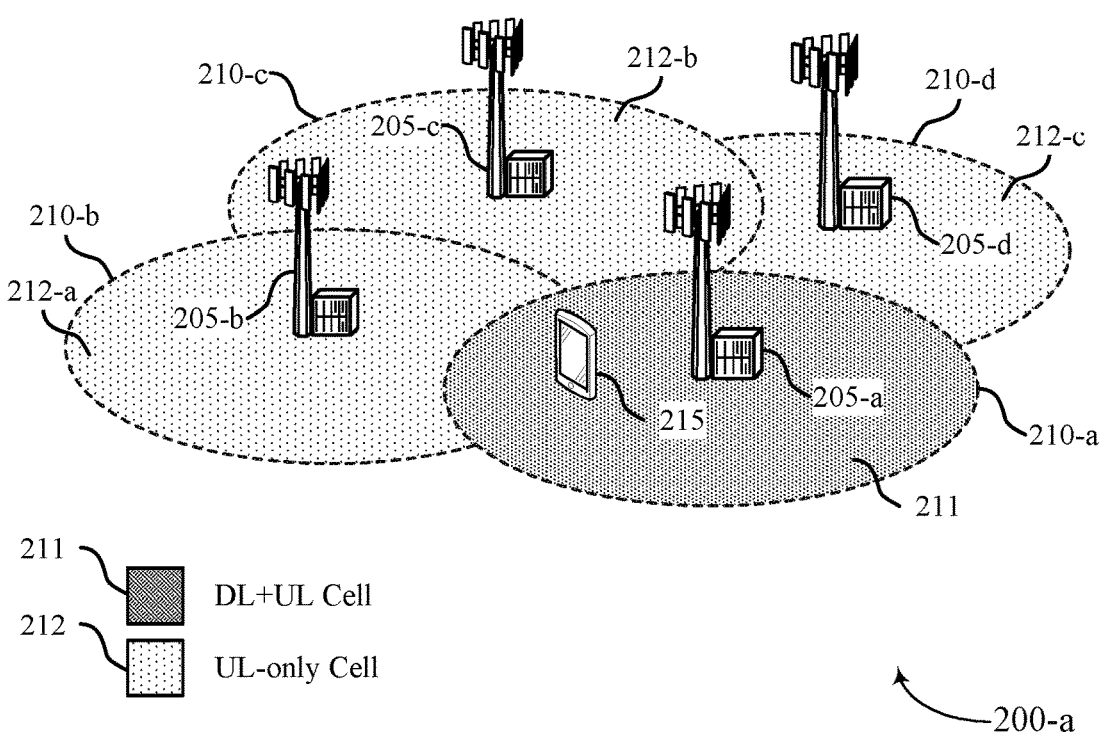
Figure 2B:
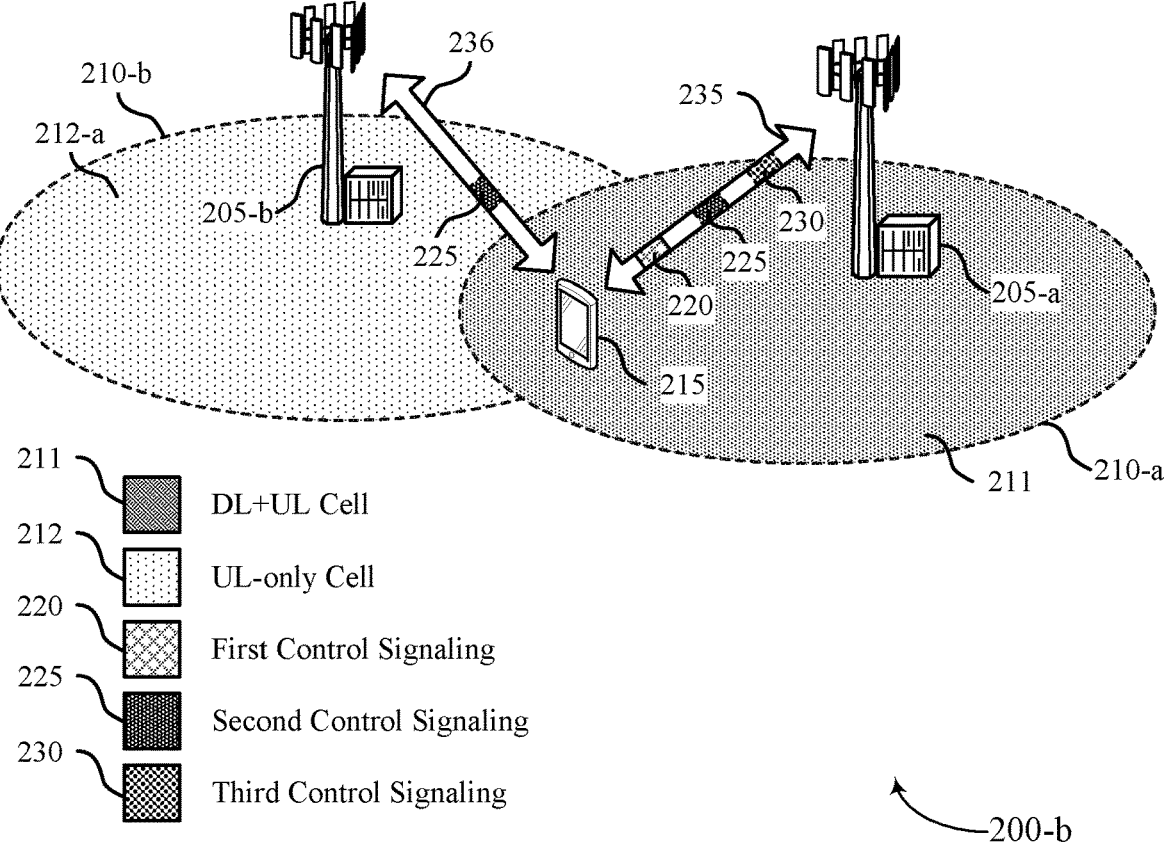

FIGS. 2A and 2B show examples of wireless communications systems 200 (e.g., a wireless communications system 200-*a*, a wireless communications system 200-*b*) that support CA for UL cells in accordance with one or more aspects of the present disclosure. In some examples, the wireless communications systems 200 may implement or be implemented by one or more aspects of the wireless communications system 100. For example, the wireless communications systems 200 may include a UE 215, which may be an example of a UE 115 illustrated by and described with reference to FIG. 1. The wireless communications systems 200 may also include one or more network entities (e.g., a network entity 205-*a*, a network entity 205-*b*, a network entity 205-*c*, a network entity 205-*d*). The network entities 205 may each be an example of one or more network entities 105 (e.g., a CU, a DU, an RU, a base station, an IAB node, or one or more other network nodes) as described with reference to FIG. 1. For example, each of the network entities 205 may communicate within one or more coverage areas 210 (e.g., a coverage area 210-*a*, a coverage area 210-*b*, a coverage area 210-*c*, and a coverage area 210-*d*).

The coverage areas 210 may be examples of a coverage area 110 as described with reference to FIG. 1. For example, each of the network entities 205 may serve a cell (e.g., a logical communication entity), which may be used for communication within a respective coverage area (e.g., a coverage area 210-*a*, a coverage area 210-*b*, a coverage area 210-*c*, a coverage area 210-*d*) via one or more carriers. In some examples, a cell may support uplink communication and downlink communication (UL+DL). For example, the network entity 205-*a* may serve a DL+UL cell 211 for uplink communication and downlink communication within the coverage area 210-*a*. As described herein, a DL+UL cell may refer to a cell that is associated with one or more bandwidth parts (e.g., within a carrier) that are usable at the UE 215 for downlink communication and one or more bandwidth parts (e.g., within the carrier) that are usable at the UE 215 for uplink communication. In other words, a DL+UL cell corresponds to a cell in which UL bandwidth parts and DL bandwidth parts are configured for the cell. For example, the UE 215 may receive control signaling (e.g., RRC signaling, a system information block (SIB), such as a SIB1) for a cell that indicates one or more bandwidth parts (e.g., within a carrier) that are usable at the UE 215 for downlink communication within the cell and one or more bandwidth parts that are usable at the UE 215 for uplink communication within the cell. Accordingly, the control signaling may indicate, to the UE 215, that the cell is a DL+UL cell. In other words, based on the control signaling, the UE 215 may interpret the cell as a DL+UL cell.

The wireless communications systems 200 may include features for improved communications between the network entities 205 and the UE 215, among other benefits. For example, to increase the data capacity of the network, the wireless communications systems 200 may support CA, in which multiple carriers (e.g., component carriers) may be combined into a single data channel. That is, CA may be used to enhance throughput through diversity (e.g., enhance a maximum or otherwise suitable throughput, such as by adding more component carriers). For example, the UE 215 may be configured with multiple uplink carriers that may each be associated with a respective cell, which may be referred to as a serving cell. In such an example, the UE 215 may use one or more of the uplink carriers for uplink CA (UL-CA). For example, to increase the throughput of uplink communications between the UE 215 and the network, the UE 215 may use UL-CA to simultaneously transmit uplink signaling on multiple uplink carriers. In some examples, UL-CA communication may be configured via RRC signaling and scheduled via a carrier indication field (CIF) in downlink control information (DCI) or RRC signaling.

In some examples, to increase uplink performance, the wireless communications systems 200 may support supplementary uplink (SUL), in which the UE 215 may be configured with a SUL carrier (e.g., for a cell). For example, the SUL carrier may be configured at the UE 215 as an (additional) uplink carrier of the DL+UL cell 211. The SUL carrier may operate in a lower frequency band relative to or more other carriers of the DL+UL cell 211. As such, the UE 215 may use the SUL carrier to extend uplink coverage, for example, if the one or more other carriers of the cell are in outage (e.g., lack suitable connectivity with the network). That is, if channel condition of a carrier of the DL+UL cell 211 fall below some threshold, the UE 215 may extend the uplink coverage for the DL+UL cell 211 by switching from the carrier to the SUL carrier. In other words, SUL may provide an alternative uplink path for the UE 215, for example, if a carrier (e.g., a TDD carrier) is in outage. SUL communication may be configured and scheduled at the UE 215 via control signaling. For example, SUL communication may be configured at the UE 215 via either RRC signaling or a SIB1. Additionally, SUL communication may be scheduled by an indicator, such as an UL or SUL indicator, in DCI.

In some examples, cell connectivity may be constrained to downlink-only (DL-only) cells and DL+UL cells. As described herein, a DL-only cell refers to a cell that is associated with one or more bandwidth parts (e.g., within a carrier) that are usable at the UE 215 for downlink communication and that lacks an association with one or more bandwidth parts (e.g., within a carrier) that are usable at the UE 215 for uplink communication. In other words, a DL-only cell refers to a cell in which only DL bandwidth parts are configured for the cell. For example, the UE 215 may receive control signaling (e.g., RRC signaling, a SIB1) for a cell that indicates one or more bandwidth parts (e.g., within a carrier) that are usable at the UE 215 for downlink communication within the cell and that lacks any indication of any bandwidth part that is usable at the UE 215 for uplink communication within the cell. Accordingly, the control signaling may indicate, to the UE 215, that the cell is a DL-only cell. In other words, based on the control signaling, the UE 215 may interpret the cell as a DL-only cell.

For examples in which cell connectivity may be constrained to DL-only cells and DL+UL cells, the network may use multiple (e.g., independent) frameworks for configuring UL-CA and SUL at the UE 215. For instance, the network may define one or more information elements (IEs) usable by the network (or the UE 215) for conveying information associated with UL-CA and one or more other IEs usable by the network (or the UE 215) for conveying information associated with SUL. In other words, SUL and CA (e.g., UL-CA) may be separately defined (and treated separately) by the network.

For example, the network may support an UL-CA framework that is associated with one or more features (e.g., aspects, capabilities). For example, the network may use the UL-CA framework to configure the UE 215 with one or more radio frequency band combinations for UL-CA. In other words, in accordance with the UL-CA framework, the network may configure the UE 215 with a radio frequency band combination that includes one or more radio frequency bands (e.g., one or more carriers within one or more radio frequency bands, which may be referred to as normal bands, frequency bands, or bands), which the UE 215 may aggregate for UL-CA. The UL-CA framework may support a connected mode. That is, the UE 215 may perform UL-CA while operating in a connected mode (e.g., an RRC connected mode). In some examples, the UL-CA framework may support multiple (e.g., different) modes. For example, the UL-CA framework may support a dual uplink (dualUL) mode in which the UE 215 may use multiple transmit chains for simultaneous uplink transmissions on multiple carriers (e.g., aggregated carriers). That is, in accordance with dualUL, multiple transmit chains (e.g., antenna ports, power amplifiers) may be enabled at the UE 215, such that the UE 215 may use the multiple transmit chains to simultaneously transmit uplink signaling via multiple carriers. Additionally, or alternatively, the UL-CA framework may support a switched uplink (switchedUL) mode in which the UE 215 may use uplink transmission switching to switch a transmit chain at the UE 215 between multiple carriers. That is, in accordance with switchedUL, a single transmit chain (e.g., antenna port, power amplifier) may be enabled at the UE 215 at a given time, such that the UE 215 may transmit signaling via a single carrier at a given time. In some examples, the UL-CA framework may support a scheduling mechanism in which the network may use a CIF in DCI to schedule uplink communication for the UE 215. Additionally, or alternatively, the UL-CA framework may support another scheduling mechanism (e.g., multi-cell scheduling) in which the network may schedule uplink communication for the UE 215 on multiple cells (e.g., for UL-CA).

Additionally, or alternatively, the network may support an SUL framework that is associated with one or more features (e.g., aspects, capabilities). For example, in accordance with the SUL framework, the network may configure the UE 215 with an SUL-specific band (e.g., an SUL carrier within an SUL-specific band), which may be defined (e.g., dynamically, on demand) as part of an UL+SUL band combination. In some examples, the SUL framework may support an idle mode and a connected mode. That is, the UE 215 may use the SUL carrier while operating in an idle mode (e.g., an RRC idle mode) or while operating in a connected mode (e.g., an RRC connected mode). In some examples, the SUL framework may be used in accordance with uplink transmission switching. That is, SUL operations may include the UE 215 switching a transmit chain at the UE 215 from an uplink carrier (e.g., the UL band of the UL+SUL band combination) to the SUL carrier (e.g., the UL+SUL band combination). As such, uplink transmission switching may be an SUL-specific behavior. In some examples, the SUL framework may support a scheduling mechanism in which the network may use an indicator (e.g., an UL/SUL indicator) in a DCI to schedule uplink communication for the UE 215 via the SUL carrier.

In some examples, using multiple (e.g., independent, separate) frameworks for configuring UL-CA and SUL at the UE 215 may lead to inconsistencies at the UE 215 and the network. For example, one or more features may be common to SUL and CA (e.g., UL-CA) and using the multiple frameworks to configure (e.g., separately configure) SUL and UL-CA at the UE 215 may lead to multiple (e.g., separate, different) configurations for the one or more features. As an illustrative example, uplink transmission switching may be common to both SUL and UL-CA. However, if the network (e.g., the network entity 205-*a*) separately configures SUL and UL-CA at the UE 215, the network may also separately configure uplink transmission switching for SUL and uplink transmission switching for UL-CA. That is, under uplink transmission switching. SUL and UL-CA may be separately configured. In other words, if SUL and UL-CA are separately defined (and treated separately) by the network, the network may separately define (and treat separately) uplink transmission switching at the UE 215 for SUL and UL-CA irrespective of whether uplink transmission switching is applicable for both SUL and CA, which may lead to increased overhead and inconsistencies at the UE 215 or the network.

In some other examples, the network may support a single framework for UL-CA and SUL. For example, the network (and the UE 215) may support CA for UL cells, which may provide a framework for unifying UL-CA and SUL (e.g., with uplink transmission switching). For example, in accordance with one or more techniques as described herein, the UE 215 may be connected through UL-CA to a quantity (N)

of cells, in which a portion (e.g., fraction) of the quantity of cells may be UL-only cells. As described herein, an UL-only cell refers to a cell that is associated with one or more bandwidth parts (e.g., within a carrier) that are usable at the UE 215 for uplink communication and that lacks an association with one or more bandwidth parts that are usable at the UE 215 for downlink communication. In other words, an UL-only cell refers to a cell in which only UL bandwidth parts are configured. For example, the UE 215 may receive control signaling (e.g., RRC signaling, a SIB1) for a cell that indicates one or more bandwidth parts (e.g., within a carrier) that are usable at the UE 215 for uplink communication within the cell and that lacks any indication of any bandwidth part that is usable at the UE 215 for downlink communication within the cell. Accordingly, the control signaling may indicate, to the UE 215, that the cell is an UL-only cell. In other words, based on the control signaling, the UE 215 may interpret the cell as an UL-only cell. The UE 215 may use the N cells for a combination of uplink throughput boost (e.g., via UL-CA) and uplink coverage enhancement (e.g., via SUL).

As illustrated in the example of FIG. 2A, the UE 215 may be connected to multiple cells that behave as UL-only for the UE 215. For example, the UE 215 may be connected to (e.g., may establish an RRC connection with) the DL+UL cell 211 and multiple UL-only cells (e.g., an UL-only cell 212-*a*, an UL-only cell 212-*b*, and an UL-only cell 212-*c*). The UL-only cells 212 may be cells that are perceived by the UE 215 as UL-only. That is, for the UE 215, the UL-only cells 212 may behave as UL-only cells. However, for some other UEs, one or more of the UL-only cells 212 may behave as DL+UL cells or DL-only cells. In other words, a cell that is perceived by the UE 215 as being an UL-only cell (e.g., due to only UL bandwidth parts being configured at the UE for the cell) may be perceived by other UEs as being a DL-only cell (e.g., due to only DL bandwidth parts being configured at the other UEs for the cell) or as being a DL+UL cell (e.g., due to DL bandwidth parts and UL bandwidth parts being configured at the other UEs for the cell). In other words, the UE 215 may perceive a cell as being UL-only, DL-only, or DL+UL based on one or more bandwidth parts configured at the UE 215 for the cell. Accordingly, the network may dynamically configure a cell to be (e.g., to behave as) an UL-only cell, a DL-only cell, or an DL+UL cell.

The network may configure the UE 215 with one or more bandwidth parts for a cell via control signaling. As illustrated in the example of FIG. 2B, the UE 215 may receive first control signaling 220 for a first cell (e.g., the DL+UL cell 211). The first control signaling 220 may indicate one or more first bandwidth parts that are usable by the UE 215 for uplink communication and downlink communication within the first cell. For example, the first control signaling 220 may indicate a first bandwidth part for uplink communication within the first cell and another first bandwidth part for downlink communication within the first cell. In some examples, the first control signaling may correspond to RRC signaling or a SIB1 carrying one or more first IEs (e.g., a first type of ServingCellConfig IE, a first type of ServingCellConfigCommon IE) associated with DL+UL cells. That is, the first IEs may include one or more IEs for uplink communications and downlink communications, and, in some cases, SUL. For example, the one or more first IEs may include information (e.g., IEs, fields of IEs) indicative of one or more bandwidth parts for uplink communication within the first cell and one or more bandwidth parts for downlink communication within the first cell. As such, the first control signaling 220 may indicate, to the UE 215, that the first cell is a DL+UL cell (e.g., the DL+UL cell 211). In other words, the UE 215 may perceive the first cell as the DL+UL cell 211 based on the first control signaling 220 indicating the one or more first bandwidth parts that are usable by the UE 215 for uplink communication and downlink communication within the first cell. In some examples, the first control signaling 220 may include an SUL configuration (e.g., a supplementaryUplink IE) that is usable by the UE 215 for uplink communication within the first cell. The UE 215 may interpret the first cell as being a DL+UL cell (e.g., the DL+UL cell 211) based on the first control signaling 220 (e.g., the ServingCellConfig IE) including the SUL configuration (e.g., the supplementaryUplink IE). The one or more first bandwidth parts may be within a first carrier 235 of a set of carriers for CA communication between the UE 215 and the network entity 205-*a* (or the network entity 205-*b*). The UE 215 may receive the first control signaling 220 via the first carrier 235. It is to be understood that the names of IEs and fields described herein may change based on implementation of one or more devices (e.g., the UE 215 or the network entities 205), and the examples described herein should not be considered limiting to the scope covered by the claims or the disclosure.

Additionally, as illustrated in the example of FIG. 2B, the UE 215 may receive second control signaling 225 for a second cell (e.g., the UL-only cell 212-*a*). The second control signaling 225 may indicate a second bandwidth part that is usable by the UE 215 for uplink communication within the second cell. The second bandwidth part may be within a second carrier 236 of the set of carriers. The second control signaling 225 may lack any indication of any bandwidth part that is usable by the UE 215 for downlink communication within the second cell. In some examples, the second control signaling 225 may also lack any indication of any SUL configuration that is usable by the UE 215 for uplink communication within the second cell. For example, the second control signaling may correspond to RRC signaling or a SIB1 carrying one or more second IEs (e.g., a second type of ServingCellConfig IE, a second type of ServingCellConfigCommon IE) associated with UL-only cells. The one or more second IEs may lack one or more IEs for downlink communications or SUL. For example, the UE 215 may be configured with the UL-only cell 212-*a* via RRC signaling (or a SIB1) using the second type of ServingCellConfig IE, which may lack any indication of IEs associated with a physical downlink shared channel (PDSCH) or SUL. That is, the second control signaling 225 may lack any indication of PDSCH-related IEs (e.g. may not include an initialDownlinkBWP IE, a downlinkBWP-ToReleaseList IE, or a PDSCH-ServingCellConfig IE) and may lack any indication of a supplementaryUplink IE. As such, the second control signaling 225 may indicate, to the UE 215, that the second cell is an UL-only cell (e.g., the UL-only cell 212-*a*). In other words, the UE 215 may perceive the second cell as the UL-only cell 212-*a* based on the second control signaling 225 indicating the second bandwidth part that is usable by the UE 215 for uplink communication and lacking any indication of any bandwidth part that is usable by the UE 215 for downlink communication (e.g., and lacking any indication of any SUL configuration that is usable by the UE 215 for uplink communication). That is, if no DL bandwidth part is configured for the second cell, the UE 215 may interpret the second cell as an UL-only cell (e.g., with SUL or enhanced SUL (eSUL) behavior). In some examples, the network may use the second control signaling to configure one or multiple UL-only cells (e.g., one or multiple of the UL-only cells 212). For example, the second control signaling may include the second type of ServingCellConfig IE, which may include one or multiple uplink configurations (e.g., UplinkConfig fields) for one or multiple of the UL-only cells 212. That is, multiple UL-only cells may be configured using multiple UplinkConfig fields within the second control signaling 225 (e.g., in the second type of ServingCellConfig IE transmitted via the second control signaling 225). In some other examples, the network may use multiple IEs (e.g., of the second type of ServingCellConfig IE) to configure multiple of the UL-only cells 212. The UE 215 may receive the second control signaling 225 via the first carrier 235 or via the second carrier 236. That is, the second control signaling 225 may correspond to a SIB1 and the UE 215 may receive the SIB1 via the first carrier of the DL+UL cell 211 or via the second carrier of the UL-only cell 212-*a*.

As illustrated in the example of FIG. 2B, the UE 215 may monitor the first carrier 235 for signaling (e.g., third control signaling 230) associated with the second cell (e.g., the UL-only cell 212-*a*). For example, the UE 215 may monitor the first carrier 235 for the third control signaling 230 based on the second control signaling 225 lacking any indication of any bandwidth part that is usable by the UE 215 for downlink communication within the second cell (e.g., the UL-only cell 212-*a*). In other words, because the second cell is perceived by the UE 215 as being an UL-only cell (e.g., the UL-only cell 212-*a*), the UE 215 may monitor the DL+UL cell 211 (e.g., the first carrier 235 of the DL+UL cell 211) for control signaling, which the network may transmit via a bandwidth part usable for downlink communication, that is associated with the second cell. For example, the third control signaling 230 may include PDSCH signaling associated with the UL-only cell 212-*a*. That is, the network may use the DL+UL cell 211 to transmit PDSCH signaling associated with (e.g., for) one or more of the UL-only cells 212. Such PDSCH signaling may include an RRC message (e.g., an RRC IE) or a MAC-control element (MAC-CE).

In some examples, the network may configure the DL+UL cell 211 or one or more of the UL-only cells 212 with physical downlink control channel (PDCCH) monitoring occasions (e.g., PDCCH candidates) for transmission of PDCCH control signaling (e.g., DCI) that schedules uplink communication at the UE 215 via one or more of the UL-only cells 212. In other words, the UE 215 may monitor for physical uplink shared channel (PUSCH) grants for the UL-only cells using one or more cross-carrier scheduling mechanisms (e.g., and a CIF field in DCI). That is, the network may schedule each of the UL-only cells 212 using one or more cross-carrier scheduling mechanisms for PDCCH monitoring.

For example, for the UL-only cells 212, the UE 215 may refrain from monitoring one or more downlink channels. The UE 215 may refrain from monitoring PDCCH candidates of the for DCIs that correspond to downlink scheduling candidates (e.g., PDSCH grants, such as DCI formats 1_0, 1_1, or 1_2). In other words, the UE 215 may not expect to receive PDCCH signaling (e.g., DCI formats 1_0, 1_1, or 1_2) on the UL-only cells 212 that schedules downlink communications to the UE 215 via the UL-only cells 212. Additionally, for the UL-only cells 212, the UE 215 may refrain from monitoring the UL-only cells 212 for PDSCH signaling (e.g., the third control signaling 230, which may include RRC signaling or a MAC-CE) associated with the UL-only cells 212. That is, the UE 215 may not expect to receive PDSCH signaling (e.g., RRC. MAC-CE) via the UL-only cells 212.

In some examples, the UE 215 may refrain from monitoring the UL-only cells 212 for PDSCH signaling and PDCCH signaling that schedules uplink signaling on the UL-only cells 212. For example, the UE 215 may use full cross-scheduling in which the UE 215 may monitor for control signaling (e.g., DCI on the PDCCH and RRC or MAC-CE on the PDSCH) for the UL-only cells 212 from the DL+UL cell 211 (e.g., using one or more cross-carrier scheduling mechanisms). That is, the UE 215 may not expect to receive PDCCH signaling (e.g., DCI formats) that schedules uplink communications for the UL-only cells 212 via the UL-only cells 212 and may not expect to receive PDSCH signaling (e.g., RRC, MAC-CE) via the UL-only cells 212. In other words, the one or more cross-carrier scheduling mechanisms may include the UE 215 monitoring PDCCH candidates of the DL+UL cell 211 for PUSCH grants associated with one or more of the UL-only cells 212. For example, the UE 215 may monitor one or more PDCCH candidates of a control resource set (CORESET) of the DL+UL cell 211 for PUSCH grants associated with the UL-only cell 212-*a* based on the second control signaling 225 lacking any indication of any bandwidth part that is usable by the UE 215 for downlink communication within the UL-only cell 212-*a*. In such an example, the UE 215 may receive, via the one or more PDCCH candidates, a PUSCH grant (e.g., DCI) scheduling the UE 215 to transmit uplink signaling via the second bandwidth part associated with the UL-only cell 212-*a*.

In some other examples, the UE 215 may monitor PDCCH candidates for the UL-only cells 212 and may refrain from monitoring the PDSCH for the UL-only cells 212. For example, the UE 215 may use hybrid cross-scheduling in which the UE 215 may monitor PDCCH candidates of the UL-only cells 212 for control signaling (e.g., DCI) that schedules uplink communications via the UL-only cells 212. In such an example, the UE 215 may monitor the DL+UL cell 211 (e.g., a primary DL+UL cell) for PDSCH signaling (e.g., RRC, MAC-CE) associated with the UL-only cells 212. That is, the UE 215 may receive PDCCH signaling (e.g., DCI formats) that schedules uplink communications on the UL-only cells 212 via PDCCH candidates of the UL-only cells 212 and may not expect to receive PDSCH signaling (e.g., RRC, MAC-CE) for the UL-only cells 212 via the UL-only cells 212. In other words, the one or more cross-carrier scheduling mechanisms may include the UE 215 monitoring PDCCH candidates of the UL-only cells 212 for PUSCH grants associated with one or more of the UL-only cells 212. For example, the UE 215 may monitor one or more PDCCH candidates of a CORESET of the UL-only cell 212-*a* for PUSCH grants associated with the UL-only cell 212-*a* based on the second control signaling 225 lacking any indication of any bandwidth part that is usable by the UE 215 for downlink communication within the UL-only cell 212-*a*. In such an example, the UE 215 may receive, via the one or more PDCCH candidates, a PUSCH grant (e.g., DCI) scheduling the UE 215 to transmit uplink signaling via the second bandwidth part associated with the UL-only cell 212-*a*.

In some examples, the third control signaling 230 may indicate for the UE 215 to activate or deactivate one or more of the UL-only cells 212 for CA communication between the UE 215 and the network. That is, activation or deactivation of one or more of the UL-only cells 212 may be triggered via the DL+UL cell 211. For example, activation or deactivation of the UL-only cell 212-*a* may be triggered through either MAC-CE or RRC signaling transmitted via the DL+UL cell 211. That is, the network entity 205-*a* may activate or deactivate use of the UL-only cell 212-*a* for uplink communication at the UE 215 via control signaling (e.g., a MAC-CE or RRC signaling) transmitted via the DL+UL cell 211.

Additionally, or alternatively, the third control signaling 230 may indicate for the UE 215 to release one or more of the UL-only cells 212. That is, release of the UL-only cells 212 may be triggered via either a MAC-CE or RRC signaling transmitted via the DL+UL cell 211. For example, release of the UL-only cell 212-*a* (or one or more other UL-only cells) may be triggered through either a MAC-CE or RRC signaling transmitted via the DL+UL cell 211. That is, the network entity 205-*a* may release a connection between the UE 215 and the UL-only cell 212-*a* via control signaling (e.g., a MAC-CE or RRC signaling) transmitted via the DL+UL cell 211. In other words, the release of UL-only cells may be done in a primary DL+UL cell through RRC signaling or a MAC-CE.

In some examples, such as after transmitting the second control signaling 225, the network may transmit the third control signaling 230 to the UE 215. The third control signaling 230 may indicate a change of the second bandwidth part from being usable by the UE 215 for uplink communication to being usable by the UE 215 for downlink communication. In some examples, the network may additionally, or alternatively, configure the UE 215 with a quantity of bandwidth parts that are usable for uplink communication or downlink communication, or both. For example, the third control signaling 230 may indicate at least one additional bandwidth part that is usable by the UE 215 for downlink communications or uplink communications within the second cell. Thus, the network may use the third control signaling 230 to indicate a change of the second bandwidth part from being usable by the UE 215 for uplink communication to being usable by the UE 215 for downlink communication within the second cell. Or the network may use the third control signaling 230 (or other control signaling) to indicate one or more third bandwidth parts that may be usable by the UE 215, where a third bandwidth part may be usable by the UE 214 for downlink communication or uplink communication within the second cell. In other words, the network may use the third control signaling 230 to indicate, to the UE 215, one or more changes (e.g., flexible, dynamic changes) to the UL-only cell 212-*a* or the DL+UL cell 211. For example, the network may indicate a change of the UL-only cell 212-*a* from being an UL-only cell to being a DL-only cell or a DL+UL cell, or in some cases may expand the UL bandwidth for the UE 215 (e.g., by adding another UL BWP). In some examples, the network may use RRC signaling or an activation command (e.g., a MAC-CE activation command) to indicate the one or more changes to the UL-only cell 212-*a* or the DL+UL cell 211.

In some examples, configuring the UE 215 with the UL-only cells 212 may enable CA (e.g., UL-CA) using one or more SUL carriers (e.g., eSUL carriers, component carriers in which no downlink bandwidth parts are configured). Such CA may be referred to as aggregated-eSUL (A-eSUL). The network (and the UE 215) may support configuration of one or more uplink transmission switching mechanisms (e.g., modes) for UL-CA. For example, the network and the UE 215 may support uplink transmission switching for UL-CA in accordance with a first mode or in accordance with a second mode. That is the network may enable one or more of the UL-only cells 212 for uplink transmission switching in accordance with the first mode that is associated with uplink transmissions via a single transmit chain (e.g., in accordance with SwitchedUL) or in accordance with a second mode that is associated with uplink transmissions via multiple (e.g., at least two) transmit chains (e.g., in accordance with dualUL).

For example, the UE 215 may receive an indication from the network that enables the UL-only cell 212-*a* for uplink transmission switching in accordance with the first mode (e.g., SwitchedUL, which may be associated with uplink transmissions via a single transmit chain). In such an example the UE 215 may receive the third control signaling 230 via the first carrier 235 and the third control signaling 230 may schedule the UE 215 to transmit uplink signaling via the second carrier 236 in accordance with the first mode. The first mode (e.g., SwitchedUL) may lead to increased performance for the UE 215, for example, if the UE 215 experiences relatively unstable signal reception from the DL+UL cell 211 (e.g., in bursts).

In some other examples, the UE 215 may receive an indication from the network that enables the UL-only cell 212-*a* for uplink transmission switching in accordance with a second mode (e.g., DualUL, which may be associated with uplink transmissions via at least two transmit chains). In such examples, the UE 215 may receive the third control signaling 230 via the first carrier 235 and the third control signaling 230 may schedule the UE 215 to simultaneously transmit uplink signaling via the first carrier 235 and the second carrier 236 in accordance with the second mode. The second mode (e.g., DualUL) may provide enhanced throughput, for example, if the UE 215 is relatively close to the cell edge. In some examples, the second mode may be referred to as dual eSUL.

Additionally, or alternatively, the network (and the UE 215) may support a type of FDD in which the UE 215 may transmit uplink signaling one of the UL-only cells 212 (e.g., using an eSUL from one of the UL-only cells 212), while simultaneously receiving downlink signaling via the DL+UL cell 211 (e.g., via a downlink component carrier of the DL+UL cell 211). For example, the UE 215 may receive the third control signaling 230 via the first carrier 235 and the third control signaling 230 may schedule a first time domain resource for the UE 215 to transmit uplink signaling via the second carrier 236 using the type of FDD. Additionally, the UE 215 may receive fourth control signaling (not shown) via the first carrier 235. The fourth control signaling may schedule the first time domain resource for the UE 215 to receive downlink signaling via the first carrier 235 using the type of FDD.

In some examples, the network may perform power and timing control (e.g., power control and timing synchronization) through synchronization signal block (SSB) burst monitoring in the UL-only cells 212. For example, the UE 215 may monitor the second carrier 236 for a set of SSBs (e.g., an SSB burst) associated with the second carrier 236. For example, the UE 215 may monitor the second carrier 236 for the SSB burst based on the second control signaling 225 lacking any indication of any bandwidth part that is usable by the UE 215 for downlink communication within the UL-only cell 212-*a*. In some examples, based on monitoring the second carrier 236, the UE 215 may receive, via the second carrier 236, one or more SSBs of the SSB block. For the UL-only cell 212-*a*, the UE 215 may measure the one or more SSBs to determine a timing position (e.g., in a slot) and pathloss associated with the UL-only cell 212-*a*. The UE 215 may then use uplink signaling (e.g., PUSCH signaling, PUCCH signaling) for link quality reporting to UL-only cell 212-*a* (e.g., based on the measurement of the one or more SSBs). That is, the UE 215 may transmit a report to the network that is indicative of one or more metrics associated with a quality of the second carrier 236. The one or more metrics may be based on one or more measurements of the one or more SSBs. For example, the one or more metrics may include a timing position metric, or a pathloss metric, or both. The UE 215 may report the measurements to either the UL-only cell 212-*a* or the DL+UL cell 211. That is, the UE 215 may transmit the report via the first carrier 235 or via the second carrier 236. In some examples, the UE 215 may receive fourth signaling (not shown) via the first carrier 235 in response to the report. The fourth control signaling may indicate a transmit power for uplink communication via the second carrier 236. That is, in response to the reported measurements, the network may use the DL+UL cell 211 to indicate (e.g., signal) a transmit power for the UL-only cell 212-*a* to the UE 215 (e.g., after coordination with one or more of the UL-only cells 212 that the UE 215 may be connected to). In some examples, the UE 215 may perform SSB measurement and link quality reporting for each of the UL-only cells 212. That is, for one or more of the UL-only cells 212, the UE 215 may measure SSBs to determine timing position in slot and pathloss and may use the PUSCH signaling or PUCCH signaling for link quality reporting to the UL-only cells 212.

In some examples, the UE 215 may monitor for the SSB burst in accordance with one or more parameters. For example, the UE 215 may receive, via the first carrier 235, an indication of one or more parameters associated with the SSB burst. As such, monitoring for the SSB burst associated with the second carrier 236 may be in accordance with the one or more parameters. The one or more parameters include a position parameter (e.g., ssb-PositionsInBurst) that indicates a time domain position of the one or more SSBs within the SSB burst, a periodicity parameter (e.g., ssb-periodicityServingCell) that indicates a periodicity of the one or more SSBs within the SSB burst, a power parameter (e.g., ss-PBCH-BlockPower) that indicates a transmit power associated with the one or more SSBs within the SSB burst, or a subcarrier spacing parameter that indicates a subcarrier spacing of the one or more SSBs within the SSB burst, or any combination thereof. In other words, the network may signal SSB information (e.g. SSB position in burst, periodicity, SCS) to UE 215 via the DL+UL cell 211. In some examples, the network may use one or more IEs to signal the SSB information. For example, the network may use control signaling that may include the second type of ServingCellConfig IE or the second type of ServingCellConfigCommon IE. For example, the second type of ServingCellConfigCommon IE may include an ssb-PositionsInBurst, an ssb-periodicityServingCell IE, and one or more ss-PBCH-BlockPower IEs.

Additionally, or alternatively, the network may signal one or more parameters associated with TDD behavior for the UL-only cells 212. For example, the UE 215 may receive, via the first carrier 235, an indication of a pattern associated with uplink communication via the second carrier 236 using TDD. The pattern may indicate one or more time intervals allocated for uplink signaling using TDD and one or more time intervals allocated for downlink signaling using TDD. In other words, the one or more parameters may include a TDD UL/DL pattern, which may be signaled through RRC (e.g., via the second type of ServingCellConfig IE). In some examples, configuring the UE 215 with one or more of the UL-only cells 212 may reduce a likelihood of conflicts and inconsistencies between the UE 215 and the network (e.g., across use cases, such as UL-CA and SUL).

Figure 3:
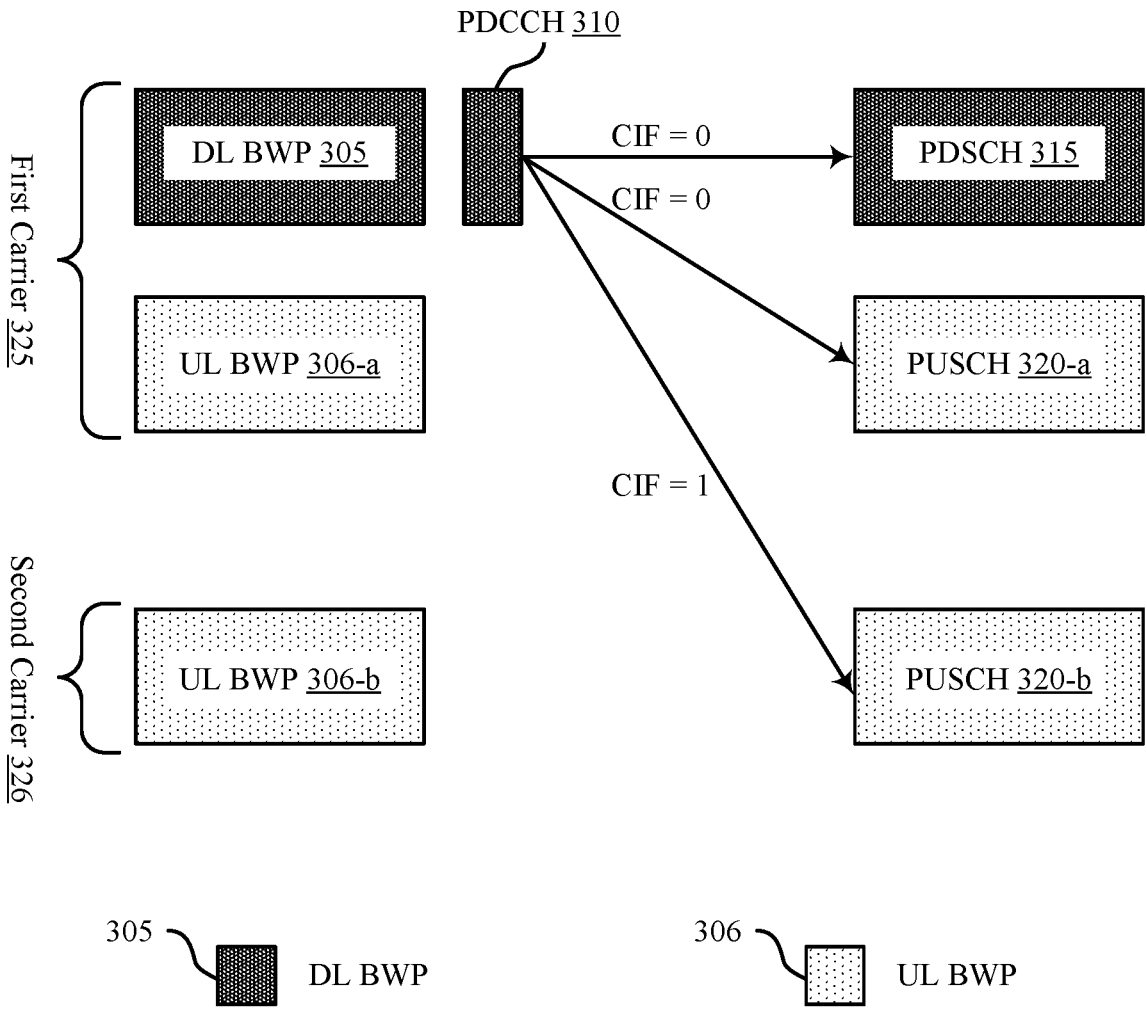
FIG. 3 shows a cross-carrier scheduling diagram that supports CA for UL cells in accordance with one or more aspects of the present disclosure.

FIG. 3 shows an example of a cross-carrier scheduling diagram 300 that supports CA for UL cells in accordance with one or more aspects of the present disclosure. In some examples, the cross-carrier scheduling diagram 300 may implement or be implemented by one or more aspects of the wireless communications system 100 and the wireless communications systems 200. For example, the cross-carrier scheduling diagram 300 may be implemented at a UE, which may be an example of a UE illustrated by and described with reference to FIGS. 1, 2A, and 2B. The cross-carrier scheduling diagram 300 may also be implemented at a network entity, which may be an example of one or more network entities 105 (e.g., a CU, a DU, an RU, a base station, an IAB node, or one or more other network nodes) illustrated by and described with reference to FIGS. 1, 2A, and 2B. The cross-carrier scheduling diagram 300 may include features for improved communications between the network entity and the UE, among other benefits.

In some examples, the UE and the network entity may support cross-carrier scheduling for UL-only cells. That is, the UE and the network entity may support a cross-carrier scheduling mechanism, which may be an example of a cross-carrier scheduling mechanism described with reference to FIGS. 2A and 2B. For example, in accordance with the cross-carrier scheduling mechanism, the UE may receive first control signaling that configures the UE with a down-link BWP (e.g., a DL BWP 305) for downlink communication within a first cell and an uplink BWP (e.g., an UL BWP 306-a) for uplink communication within the first cell. Accordingly, the UE may determine (e.g., perceive) that the first cell is a DL+UL cell. The DL+UL cell may be an example of a DL+UL cell illustrated by and described with reference to FIGS. 2A and 2B. For example, the DL+UL cell may be associated with a first carrier 325 that is a DL+UL carrier. The first carrier 325 may be an example of a first carrier illustrated by and described with reference to FIG. 2B. For example, the DL BWP 305 and the UL BWP 306-a may be within the first carrier 325. Additionally, the UE may receive second control signaling that configures the UE with an UL BWP 306-b for uplink communication within a second cell. The second control signaling may be an example of second control signaling illustrated by and described with reference to FIG. 2B. For example, the second control signaling may lack any indication of a DL BWP for downlink communication within the second cell. Accordingly, the UE may determine (e.g., perceive) that the second cell is an UL-only cell. The UL-only cell may be an example of an UL-only cell illustrated by and described with reference to FIGS. 2A and 2B. For example, the UL-only cell may be associated with a second carrier 326 that is an UL carrier. The second carrier 326 may be an example of a second carrier illustrated by and described with reference to FIG. 2B. For example, the UL BWP 306-b may be within the second carrier 326. In some examples, the network may enable SUL for the UE using a switchedUL mode of an UL-CA framework. In such examples, the SUL may be referred to as eSUL and the second carrier 326 may be referred to as an eSUL carrier. In other words, for the UE, the eSUL carrier may be interpreted as an UL-only cell. As such, the UE may not expect to receive PDSCH signaling via the eSUL carrier. Additionally, the UE may refrain from monitoring PDCCH candidates (e.g., configured by one or more searchSpaces IEs), which may be multi-cast from the network via the eSUL cell that schedules PDSCH transmissions for the eSUL carrier. The network may enable (e.g., configure) eSUL for the UE via control signaling, such as via either a SIB1 or RRC signaling.

The network may use a PDCCH 310 transmitted via the DL BWP 305 of the first carrier 325 to schedule uplink communication at the UE on the second carrier 326 (e.g., in accordance with eSUL). For example, in accordance with a cross-carrier scheduling mechanism, the network may transmit the PDCCH 310 via the DL BWP 305. The PDCCH 310 may schedule a transmission for a cell and may include DCI with a CIF (e.g., rather than an UL/SUL indicator). The UE may determine whether the PDCCH 310 is scheduling a transmission for the DL+UL cell (e.g., for the first carrier 325 of the DL+UL cell) or the UL-only cell (e.g., for the second carrier 326 (the eSUL carrier) of the UL-only cell) based on a value of the CIF. For example, if the value of the CIF is set to 0, the UE may determine that the PDCCH 310 is scheduling a transmission for the DL+UL cell. That is, if the value of the CIF is set to 0, the UE may determine that the PDCCH 310 is scheduling transmission of a PDSCH 315 via the DL BWP 305 of the first carrier 325 or transmission of a PUSCH 320-a via the UL BWP 306-a of the first carrier 325. Alternatively, if the value of the CIF is set to 1, the UE may determine that the PDCCH 310 is scheduling a transmission for the UL-only cell. That is, if the value of the CIF is set to 1, the UE may determine that the PDCCH 310 is scheduling transmission of a PUSCH 320-b via the UL BWP 306-b of the second carrier 326. In some examples, using the cross-scheduling mechanism to schedule transmission of the PUSCH 320-a on the UL-only cell may lead to reduced latency and increased performance, among other benefits.

Figure 4:
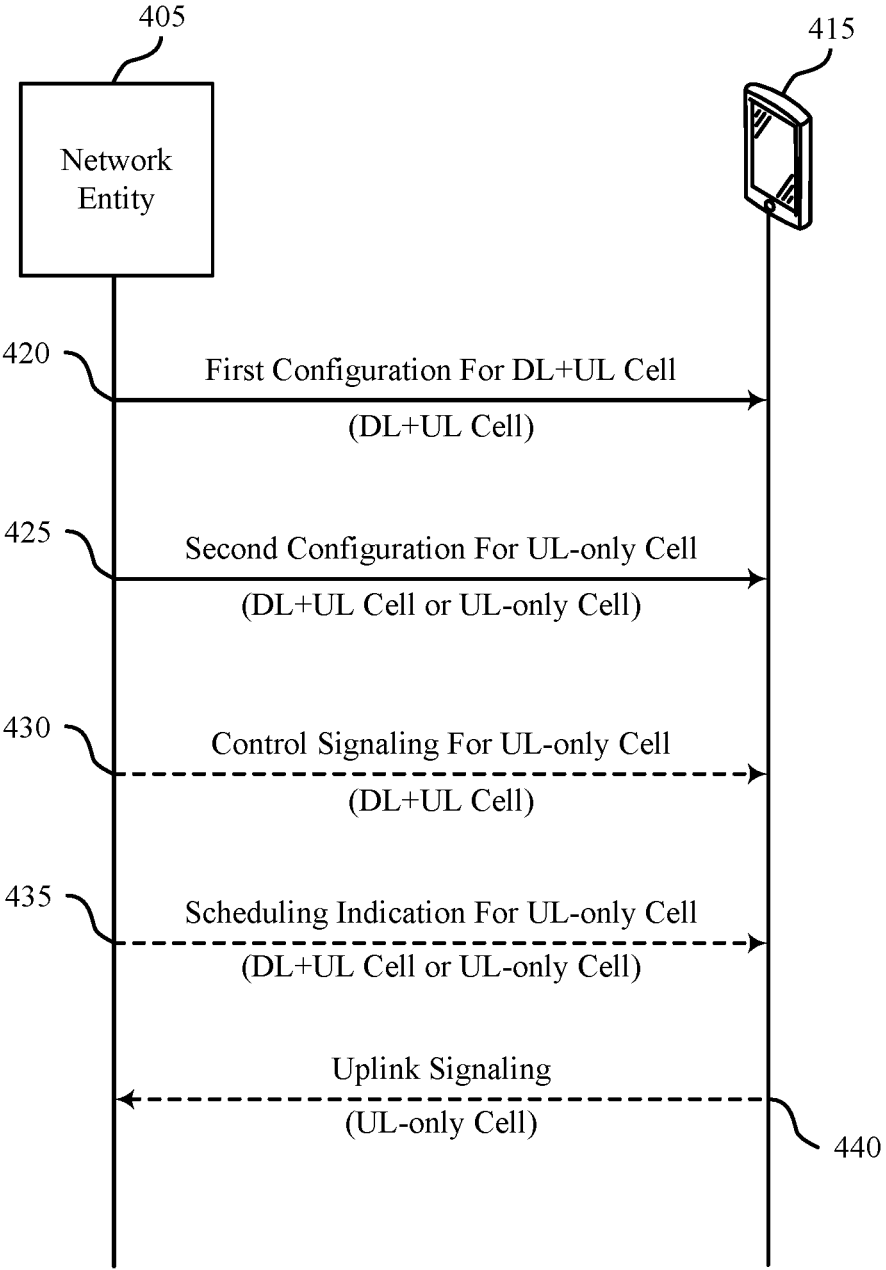
FIG. 4 shows a process flow that supports CA for UL cells in accordance with one or more aspects of the present disclosure.

FIG. 4 shows an example of a process flow 400 that supports CA for UL cells in accordance with one or more aspects of the present disclosure. The process flow 400 may implement or may be implemented by aspects of the wireless communications system 100, the wireless communications systems 200, and the cross-carrier scheduling diagram 300. For example, the process flow 400 illustrates operations at a network entity 405, which may be an example of a network entity (e.g., a CU, a DU, an RU, a base station, an IAB node, or one or more other network nodes) illustrated by and described with reference to FIGS. 1, 2A, 2B, and 3. Additionally, the process flow 400 illustrates operations at a UE 415, which may be an example of a UE illustrated by and described with reference to FIGS. 1, 2A, 2B, and 3. The operations performed at the network entity 405 and the UE 415 may support improvements to communications between the network entity 405 and the UE 415, among other benefits. In the following description of the process flow 400, the operations performed at the network entity 405 and the UE 415 may occur in a different order than the example order shown. Additionally, the operations performed at the network entity 405 and the UE 415 may be performed at different times. Some operations may be combined, and some operations may be omitted. In some examples, the network entity 405 and the UE 415 may support a framework for using UL-only cells to unify UL-CA and SUL.

At 420, the UE 415 may receive a first configuration for a DL+UL cell. The UE 415 may receive the first configuration via the DL+UL cell. For example, the first configuration may correspond to first control signaling (e.g., RRC signaling, a SIB1) that indicates one or more first bandwidth parts that are usable by the UE 415 for uplink communication and downlink communication within a first cell (e.g., the DL+UL cell). The one or more first bandwidth parts may be within a first carrier of a set of carriers for UL-CA communication between the UE 415 and the network entity 405. The first carrier may be an example of a first carrier illustrated by and described with reference to FIGS. 2B and

3. For example, the first carrier may include a DL BWP for downlink communication and an UL BWP for uplink communication.

At 425, the UE 415 may receive a second configuration for an UL-only cell. The UE 415 may receive the second configuration via the DL+UL cell or via the UL-only cell. For example, the second configuration may correspond to second control signaling (e.g., RRC signaling, a SIB 1) that indicates a second bandwidth part that is usable by the UE 415 for uplink communication within the UL-only cell. The second control signaling may lack any indication of any bandwidth part that usable by the UE 415 for downlink communication within the second cell. The second bandwidth part (e.g., an UL BWP) may be within a second carrier of the set of carriers.

In some examples, the UE 415 may monitor the first carrier for control signaling (e.g., third control signaling) associated with the UL-only cell. For example, the UE 415 may monitor the first carrier of the DL+UL cell for control signaling based on the second control signaling lacking any indication of any bandwidth part that is usable by the UE 415 for downlink communication within the UL-only cell (e.g., based on the UL-only cell not being configured with an DL BWPs).

In some examples, at 430, the UE 415 may receive the control signaling for the UL-only cell via the DL+UL cell. The control signaling may include PDSCH signaling, such as an RRC message or a MAC-CE. That is, the UE 415 may not expect to receive PDSCH signaling for the UL-only cell via the UL-only cell. Accordingly, the UE 415 may receive the control signaling for the UL-only cell via the DL+UL cell.

In some examples, at 435, the UE 415 may receive a scheduling indication (e.g., DCI) for the UL-only cell. For example, the UE 415 may support one or more cross-carrier scheduling mechanisms that the network may use to schedule uplink signaling from the UE 415 via the UL-only cell (e.g., via the second bandwidth part of the second carrier of the UL-only cell).

In some examples, the UE 415 may support a full cross-scheduling mechanism in which the UE 415 may monitor one or more PDCCH candidates of a COREST of the DL+UL cell for the scheduling indication. That is, the UE 415 may monitor the DL+UL cell based on the second configuration (e.g., the second control signaling) lacking any indication of any bandwidth part that is usable by the UE 415 for downlink communication within the UL-only cell. In such examples, the UE 415 may receive the scheduling indication (at 435) via the PDCCH candidates of the DL+UL cell.

In some other examples, the UE 415 may support ta hybrid cross-scheduling mechanism in which the UE 415 may monitor one or more PDCCH candidates of a CORESET of the UL-only cell for the scheduling indication. That is, the UE 415 may monitor the PDCCH candidate of the UL-only cell based on the second configuration (e.g., the second control signaling) lacking any indication of any bandwidth part that is usable by the UE 415 for downlink communication within the UL-only cell. In such examples, the UE 415 may receive the scheduling indication (at 435) via the UL-only cell (e.g., the PDCCH candidates of the UL-only cell).

At 440, the UE 415 may transmit the uplink signaling via the second bandwidth part of the UL-only cell. The uplink signaling may include PUSCH signaling. For example, the scheduling indication may correspond to a PUSCH grant. In some examples, using the full cross-scheduling mechanism or the hybrid cross-scheduling mechanism to schedule uplink signaling at the UE 415 via the UL-only cell may lead to reduced latency and increased performance, among other benefits.

Figure 5:
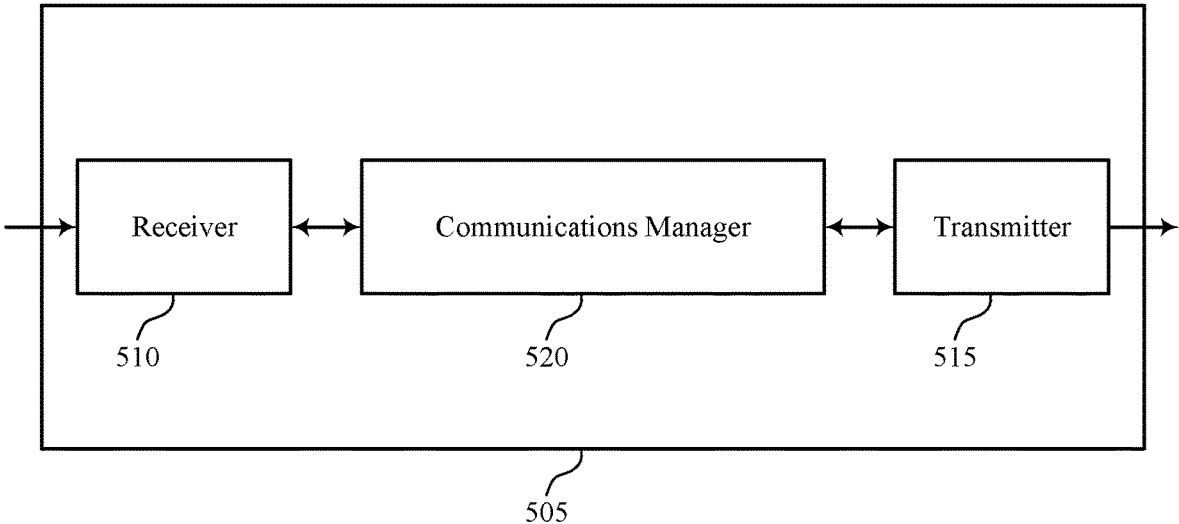
FIGS. 5 and 6 show block diagrams of devices that support CA for UL cells in accordance with one or more aspects of the present disclosure.

FIG. 5 shows a block diagram 500 of a device 505 that supports CA for UL cells in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to CA for UL cells). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to CA for UL cells). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of CA for UL cells as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for receiving first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and a network entity. The communications manager 520 is capable of, configured to, or operable to support a means for receiving second control signaling for a second cell, where the second control signaling indicates a second bandwidth part that is usable by the UE for uplink communication within the second cell, where the second control signaling lacks any indication of any bandwidth part that usable by the UE for downlink communication within the second cell, and where the second bandwidth part is within a second carrier of the set of carriers. The communications manager 520 is capable of, configured to, or operable to support a means for monitoring the first carrier for third control signaling associated with the second cell, where monitoring the first carrier for the third control signaling is based on the second control signaling lacking any indication of any bandwidth part that is usable by the UE for downlink communication within the second cell.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for more efficient utilization of communication resources.

Figure 6:
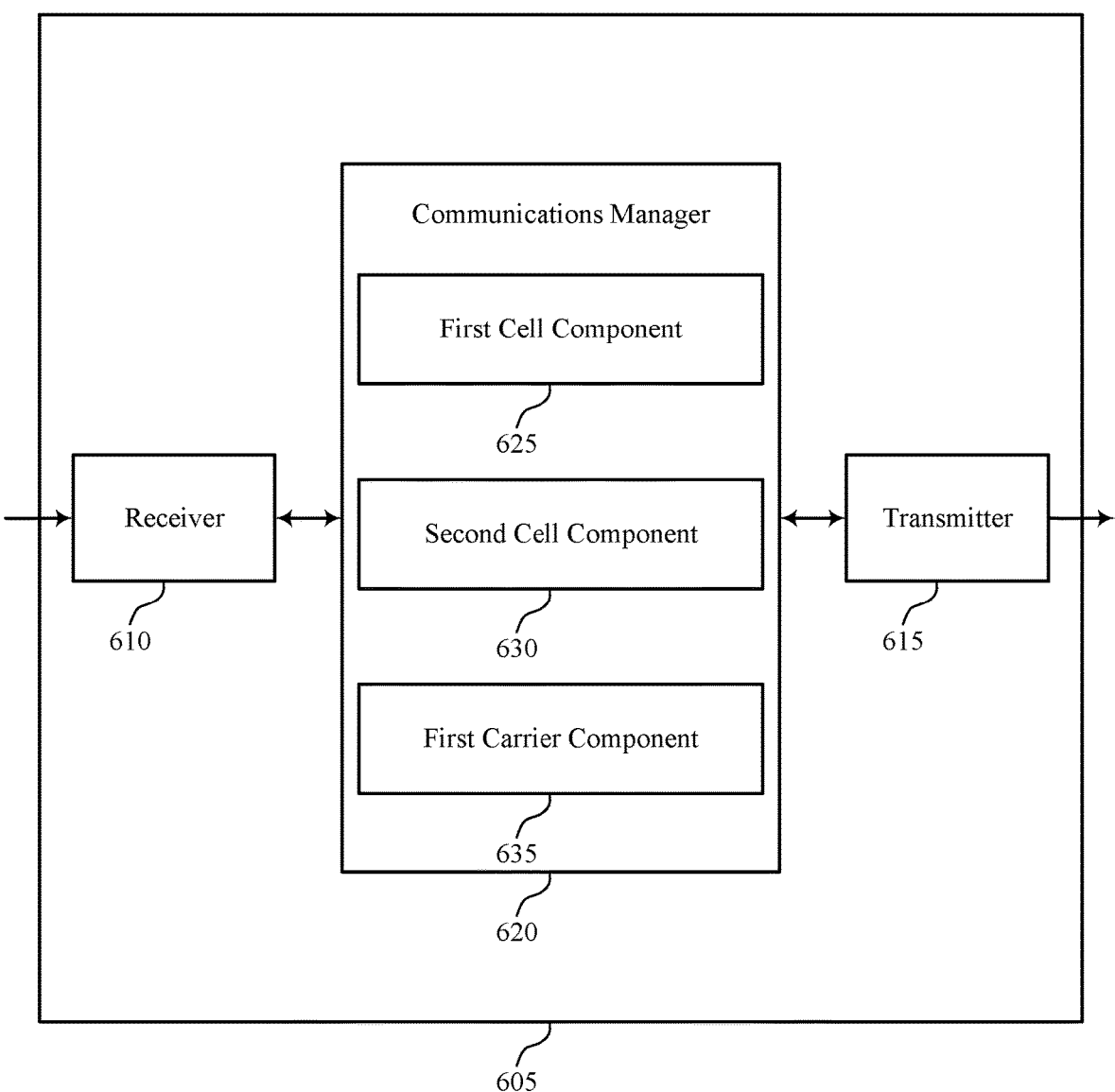

FIG. 6 shows a block diagram 600 of a device 605 that supports CA for UL cells in accordance with one or more aspects of the present disclosure. The device 605 may be an example of aspects of a device 505 or a UE 115 as described herein. The device 605 may include a receiver 610, a transmitter 615, and a communications manager 620. The device 605, or one of more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to CA for UL cells). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to CA for UL cells). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of CA for UL cells as described herein. For example, the communications manager 620 may include a first cell component 625, a second cell component 630, a first carrier component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The first cell component 625 is capable of, configured to, or operable to support a means for receiving first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and a network entity. The second cell component 630 is capable of, configured to, or operable to support a means for receiving second control signaling for a second cell, where the second control signaling indicates a second bandwidth part that is usable by the UE for uplink communication within the second cell, where the second control signaling lacks any indication of any bandwidth part that usable by the UE for downlink communication within the second cell, and where the second bandwidth part is within a second carrier of the set of carriers. The first carrier component 635 is capable of, configured to, or operable to support a means for monitoring the first carrier for third control signaling associated with the second cell, where monitoring the first carrier for the third control signaling is based on the second control signaling lacking any indication of any bandwidth part that is usable by the UE for downlink communication within the second cell.

Figure 7:
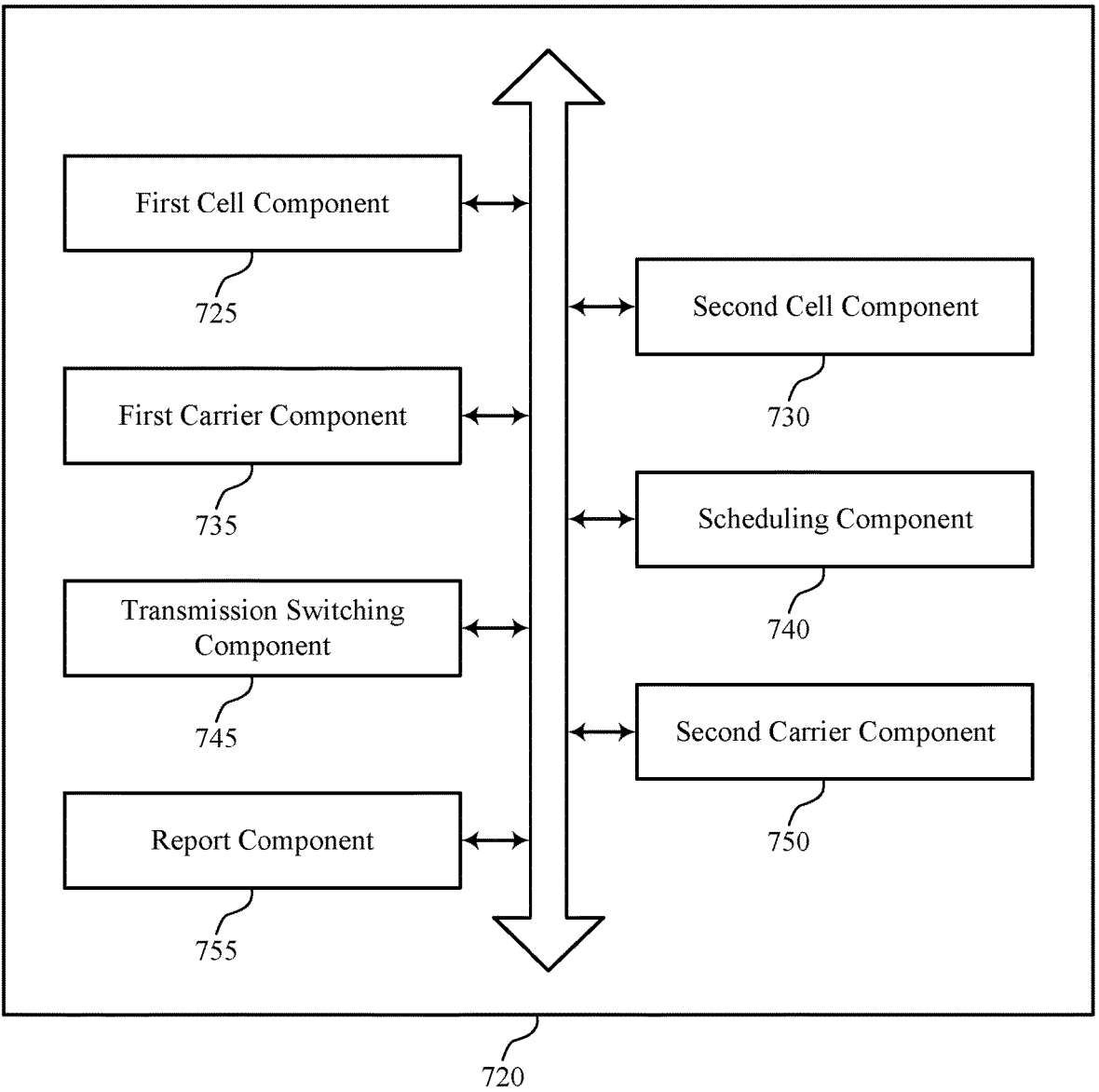
FIG. 7 shows a block diagram of a communications manager that supports CA for UL cells in accordance with one or more aspects of the present disclosure.

FIG. 7 shows a block diagram 700 of a communications manager 720 that supports CA for UL cells in accordance with one or more aspects of the present disclosure. The communications manager 720 may be an example of aspects of a communications manager 520, a communications manager 620, or both, as described herein. The communications manager 720, or various components thereof, may be an example of means for performing various aspects of CA for UL cells as described herein. For example, the communications manager 720 may include a first cell component 725, a second cell component 730, a first carrier component 735, a scheduling component 740, a transmission switching component 745, a second carrier component 750, a report component 755, or any combination thereof. Each of these components, or components or subcomponents thereof (e.g., one or more processors, one or more memories), may communicate, directly or indirectly, with one another (e.g., via one or more buses).

The communications manager 720 may support wireless communication in accordance with examples as disclosed herein. The first cell component 725 is capable of, configured to, or operable to support a means for receiving first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and a network entity. The second cell component 730 is capable of, configured to, or operable to support a means for receiving second control signaling for a second cell, where the second control signaling indicates a second bandwidth part that is usable by the UE for uplink communication within the second cell, where the second control signaling lacks any indication of any bandwidth part that usable by the UE for downlink communication within the second cell, and where the second bandwidth part is within a second carrier of the set of carriers. The first carrier component 735 is capable of, configured to, or operable to support a means for monitoring the first carrier for third control signaling associated with the second cell, where monitoring the first carrier for the third control signaling is based on the second control signaling lacking any indication of any bandwidth part that is usable by the UE for downlink communication within the second cell.

In some examples, the first cell component 725 is capable of, configured to, or operable to support a means for monitoring one or more PDCCH candidates of a CORESET associated with the first cell, where monitoring the one or more PDCCH candidates is based on the second control signaling lacking any indication of any bandwidth part that is usable by the UE for downlink communication within the second cell. In some examples, the scheduling component 740 is capable of, configured to, or operable to support a means for receiving, via the one or more PDCCH candidates, DCI scheduling the UE to transmit uplink signaling via the second bandwidth part associated with the second cell.

In some examples, the second cell component 730 is capable of, configured to, or operable to support a means for monitoring one or more PDCCH candidates of a CORESET associated with the second cell, where monitoring the one or more PDCCH candidates is based on the second control signaling lacking any indication of any bandwidth part that usable by the UE for downlink communication. In some examples, the scheduling component 740 is capable of, configured to, or operable to support a means for receiving, via the one or more PDCCH candidates, DCI scheduling the UE to transmit uplink signaling via the second bandwidth part associated with the second cell within the second cell.

In some examples, the first carrier component 735 is capable of, configured to, or operable to support a means for receiving, via the first carrier, the third control signaling associated with the second cell, where the third control signaling includes an RRC message or a MAC-CE. In some examples, the third control signaling indicates for the UE to activate or deactivate the second cell for CA communication between the UE and the network entity. In some examples, the third control signaling indicates for the UE to release the second cell.

In some examples, the transmission switching component 745 is capable of, configured to, or operable to support a means for receiving an indication that enables the second cell for uplink transmission switching in accordance with a first mode, the first mode associated with uplink transmissions via a single transmit chain. In some examples, the first carrier component 735 is capable of, configured to, or operable to support a means for receiving the third control signaling via the first carrier, where the third control signaling schedules the UE to transmit uplink signaling via the second carrier in accordance with the first mode.

In some examples, the transmission switching component 745 is capable of, configured to, or operable to support a means for receiving an indication that enables the second cell for uplink transmission switching in accordance with a second mode, the second mode associated with uplink transmissions via at least two transmit chains. In some examples, the first carrier component 735 is capable of, configured to, or operable to support a means for receiving the third control signaling via the first carrier, where the third control signaling schedules the UE to simultaneously transmit uplink signaling via the first carrier and the second carrier in accordance with the second mode.

In some examples, the first carrier component 735 is capable of, configured to, or operable to support a means for receiving the third control signaling via the first carrier, where the third control signaling schedules a first time domain resource for the UE to transmit uplink signaling via the second carrier using FDD. In some examples, the first carrier component 735 is capable of, configured to, or operable to support a means for receiving fourth control signaling via the first carrier, where the fourth control signaling schedules the first time domain resource for the UE to receive downlink signaling via the first carrier using the FDD.

In some examples, the second carrier component 750 is capable of, configured to, or operable to support a means for monitoring the second carrier for a set of SSBs associated with the second carrier, where monitoring the second carrier for the set of SSBs is based on the second control signaling lacking any indication of any bandwidth part that is usable by the UE for downlink communication within the second cell. In some examples, the second carrier component 750 is capable of, configured to, or operable to support a means for receiving, via the second carrier, at least one SSB of the set of SSBs.

In some examples, the report component 755 is capable of, configured to, or operable to support a means for transmitting a report that is indicative of one or more metrics associated with a quality of the second carrier, where the one or more metrics are based on one or more measurements of the at least one SSB.

In some examples, the first cell component 725 is capable of, configured to, or operable to support a means for receiving, via the first cell in response to the report, fourth control signaling that indicates a transmit power for uplink communication via the second carrier. In some examples, the report is transmitted via the first carrier or the second carrier.

In some examples, the one or more metrics include a timing position metric, or a pathloss metric, or both.

In some examples, to support receiving the second control signaling, the first carrier component 735 is capable of, configured to, or operable to support a means for receiving, via the first carrier, an indication of one or more parameters associated with the set of SSBs, where monitoring for the set of SSBs associated with the second carrier is in accordance with the one or more parameters.

In some examples, the one or more parameters include a position parameter that indicates a time domain position of one or more SSBs within the set of SSBs, a periodicity parameter that indicates a periodicity of one or more SSBs within the set of SSBs, a power parameter that indicates a transmit power associated with one or more SSBs within the set of SSBs, or a subcarrier spacing parameter that indicates a subcarrier spacing of one or more SSBs within the set of SSBs, or any combination thereof.

In some examples, to support receiving the second control signaling, the first carrier component 735 is capable of, configured to, or operable to support a means for receiving, via the first carrier, an indication of a pattern associated with uplink communication via the second carrier using TDD.

In some examples, to support receiving the second control signaling, the first carrier component 735 is capable of, configured to, or operable to support a means for receiving the second control signaling via the first carrier or the second carrier, where the second control signaling includes a SIB. In some examples, the second control signaling lacks any indication of any SUL configuration that is usable by the UE for uplink communication within the second cell.

Figure 8:
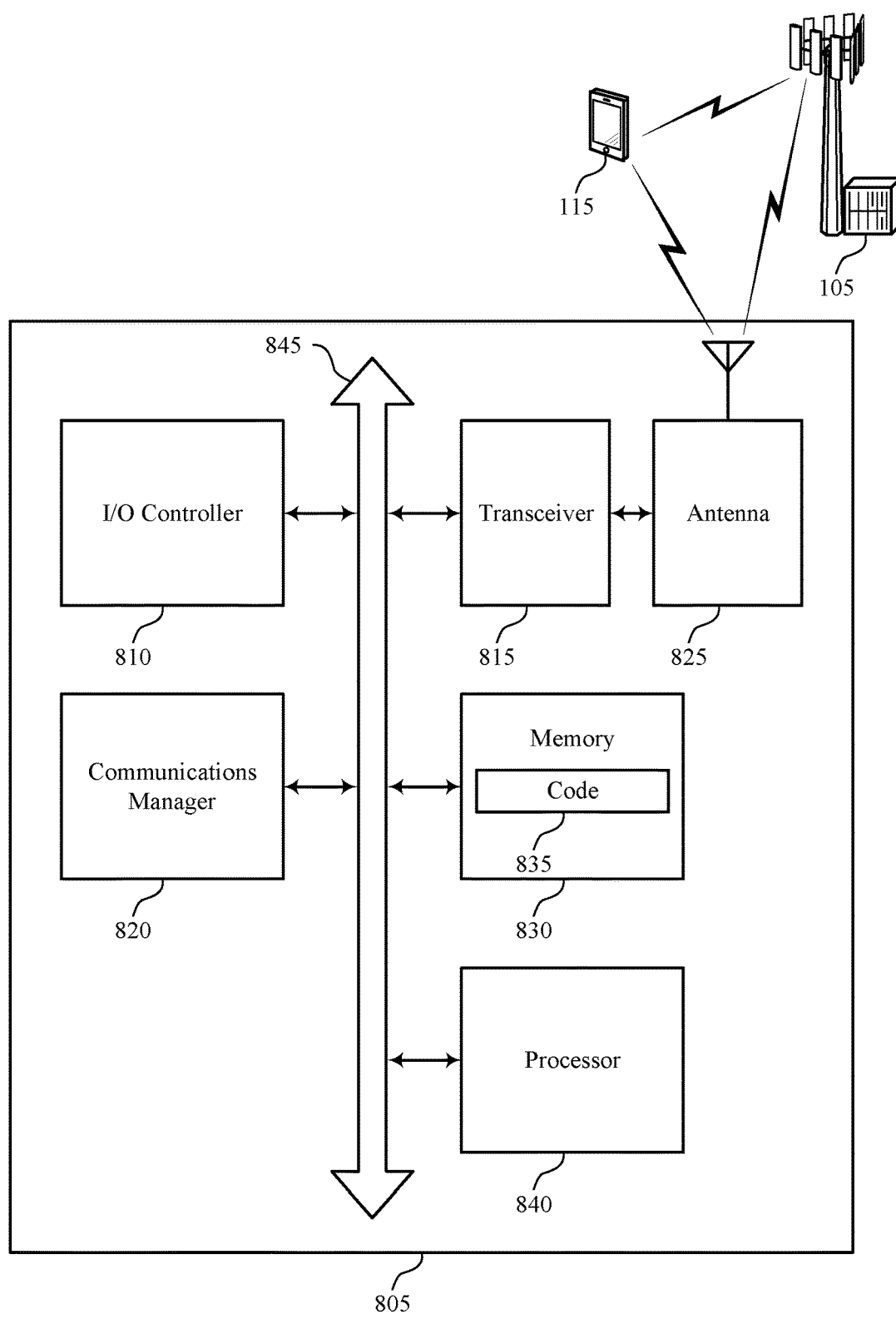
FIG. 8 shows a diagram of a system including a device that supports CA for UL cells in accordance with one or more aspects of the present disclosure.

FIG. 8 shows a diagram of a system 800 including a device 805 that supports CA for UL cells in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting CA for UL cells). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communication in accordance with examples as disclosed herein. For example, the communications manager 820 is capable of, configured to, or operable to support a means for receiving first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and a network entity. The communications manager 820 is capable of, configured to, or operable to support a means for receiving second control signaling for a second cell, where the second control signaling indicates a second bandwidth part that is usable by the UE for uplink communication within the second cell, where the second control signaling lacks any indication of any bandwidth part that usable by the UE for downlink communication within the second cell, and where the second bandwidth part is within a second carrier of the set of carriers. The communications manager 820 is capable of, configured to, or operable to support a means for monitoring the first carrier for third control signaling associated with the second cell, where monitoring the first carrier for the third control signaling is based on the second control signaling lacking any indication of any bandwidth part that is usable by the UE for downlink communication within the second cell.

By including or configuring the communications manager 820 in accordance with examples as described herein, the device 805 may support techniques for improved communication reliability, reduced latency, and more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of CA for UL cells as described herein, or the at least one processor 840 and the at least one memory 830 may be otherwise configured to, individually or collectively, perform or support such operations.

Figure 9:
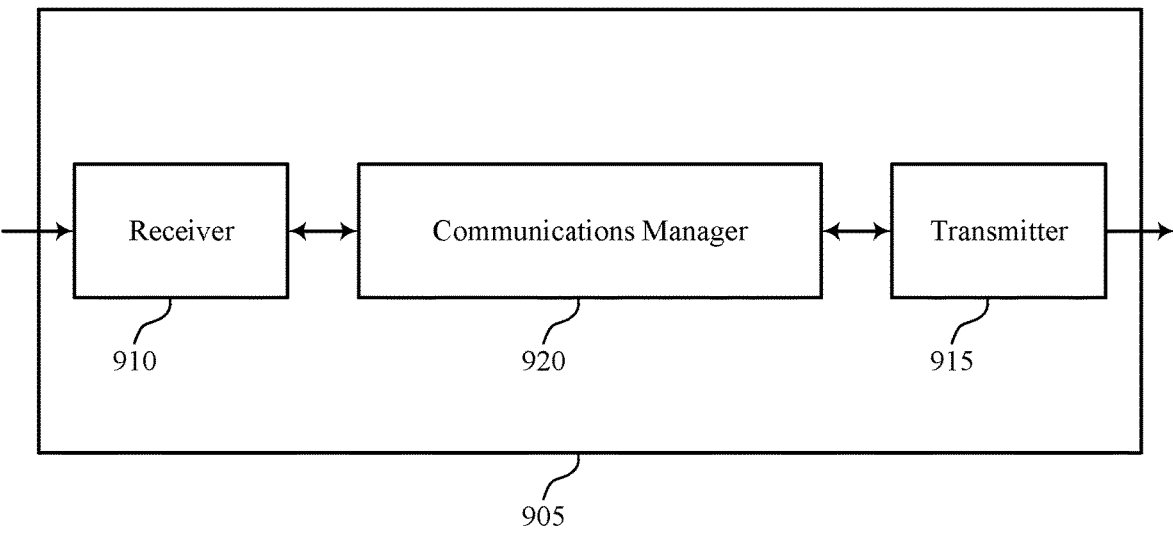
FIGS. 9 and 10 show block diagrams of devices that support CA for UL cells in accordance with one or more aspects of the present disclosure.

FIG. 9 shows a block diagram 900 of a device 905 that supports CA for UL cells in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of CA for UL cells as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 is capable of, configured to, or operable to support a means for outputting, to a UE, first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and the network entity. The communications manager 920 is capable of, configured to, or operable to support a means for outputting, to the UE, second control signaling for a second cell, where the second control signaling indicates a second bandwidth part that is usable by the UE for uplink communication within the second cell, where the second control signaling lacks any indication of any bandwidth part is usable by the UE for downlink communication within the second cell, and where the second bandwidth part is within a second carrier of the set of carriers.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for more efficient utilization of communication resources.

Figure 10:
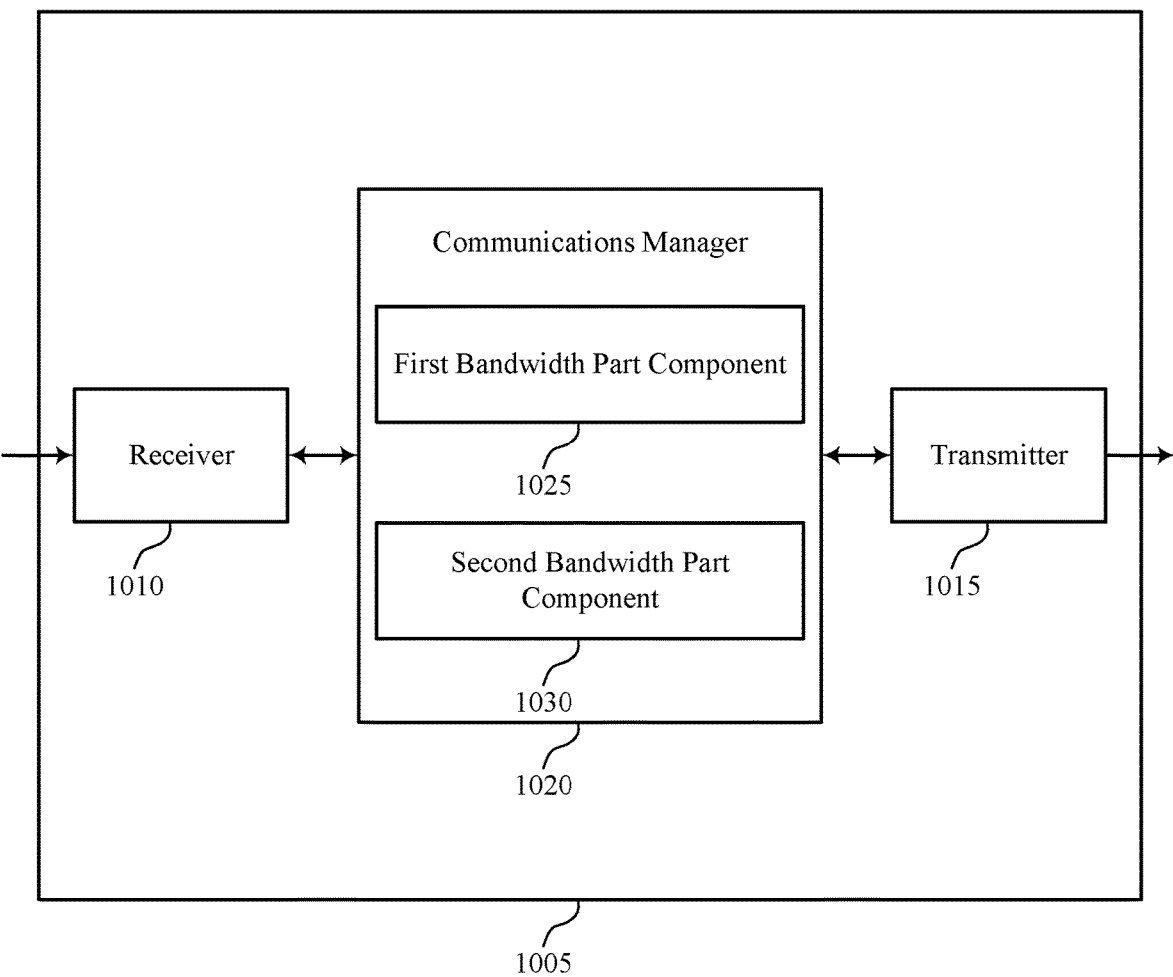

FIG. 10 shows a block diagram 1000 of a device 1005 that supports CA for UL cells in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of CA for UL cells as described herein. For example, the communications manager 1020 may include a first bandwidth part component 1025 a second bandwidth part component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The first bandwidth part component 1025 is capable of, configured to, or operable to support a means for outputting, to a UE, first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and the network entity. The second bandwidth part component 1030 is capable of, configured to, or operable to support a means for outputting, to the UE, second control signaling for a second cell, where the second control signaling indicates a second bandwidth part that is usable by the UE for uplink communication within the second cell, where the second control signaling lacks any indication of any bandwidth part is usable by the UE for downlink communication within the second cell, and where the second bandwidth part is within a second carrier of the set of carriers.

Figure 11:
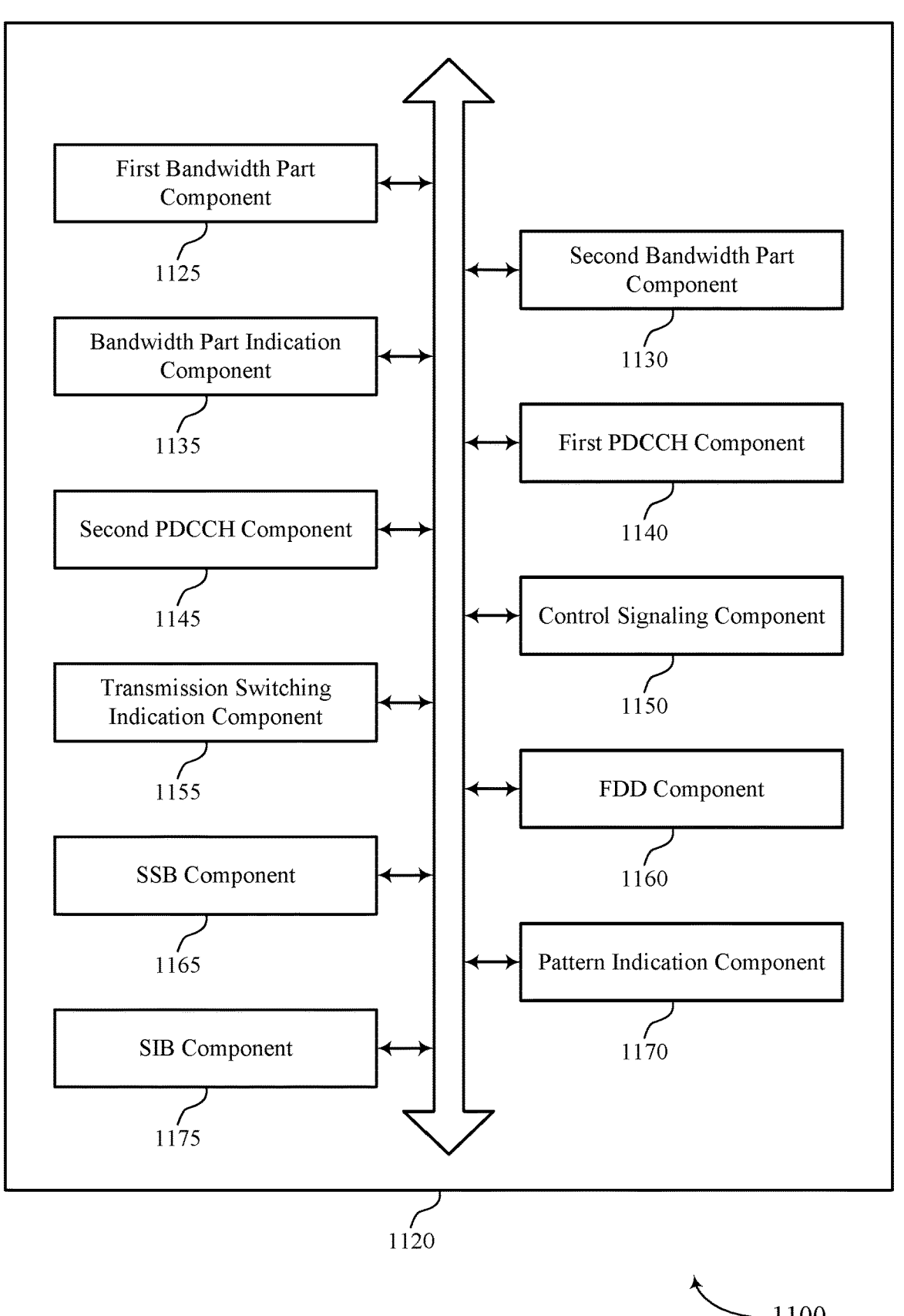
FIG. 11 shows a block diagram of a communications manager that supports CA for UL cells in accordance with one or more aspects of the present disclosure.

FIG. 11 shows a block diagram 1100 of a communications manager 1120 that supports CA for UL cells in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of CA for UL cells as described herein. For example, the communications manager 1120 may include a first bandwidth part component 1125, a second bandwidth part component 1130, a bandwidth part indication component 1135, a first PDCCH component 1140, a second PDCCH component 1145, a control signaling component 1150, a transmission switching indication component 1155, an FDD component 1160, an SSB component 1165, a pattern indication component 1170, an SIB component 1175, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication in accordance with examples as disclosed herein. The first bandwidth part component 1125 is capable of, configured to, or operable to support a means for outputting, to a UE, first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and the network entity. The second bandwidth part component 1130 is capable of, configured to, or operable to support a means for outputting, to the UE, second control signaling for a second cell, where the second control signaling indicates a second bandwidth part that is usable by the UE for uplink communication within the second cell, where the second control signaling lacks any indication of any bandwidth part is usable by the UE for downlink communication within the second cell, and where the second bandwidth part is within a second carrier of the set of carriers.

In some examples, the second bandwidth part component 1130 is capable of, configured to, or operable to support a means for outputting, to a second UE, third control signaling for the second cell, where the third control signaling indicates that the second carrier is usable by the second UE for uplink communication and downlink communication within the second cell.

In some examples, the bandwidth part indication component 1135 is capable of, configured to, or operable to support a means for outputting, to the UE via the first cell and after outputting the second control signaling, third control signaling for the second cell, where the third control signaling indicates a change of the second bandwidth part from being usable by the UE for uplink communication to being usable by the UE for downlink communication or indicates at least one additional bandwidth part that is usable by the UE for downlink or uplink communications.

In some examples, the first PDCCH component 1140 is capable of, configured to, or operable to support a means for outputting, via one or more PDCCH candidates associated with the first cell, DCI scheduling the UE to transmit uplink signaling via the second bandwidth part associated with the second cell, where outputting the DCI via the one or more PDCCH candidates is based on the second control signaling lacking any indication of any bandwidth part that is usable by the UE for downlink communication within the second cell.

In some examples, the second PDCCH component 1145 is capable of, configured to, or operable to support a means for outputting, via one or more PDCCH candidates associated with the second cell, DCI scheduling the UE to transmit uplink signaling via the second bandwidth part associated with the second cell, where outputting the DCI via the one or more PDCCH candidates is based on the second control signaling lacking any indication of any bandwidth part that is usable by the UE for downlink communication within the second cell.

In some examples, the control signaling component 1150 is capable of, configured to, or operable to support a means for outputting, via the first carrier, third control signaling associated with the second cell, where outputting the third control signaling via the first carrier is based on the second control signaling lacking any indication of any bandwidth part that is usable by the UE for downlink communication within the second cell.

In some examples, the third control signaling indicates for the UE to activate the second cell for CA communication between the UE and the network entity, to deactivate the second cell for CA communication between the UE and the network entity, or to release the second cell.

In some examples, the transmission switching indication component 1155 is capable of, configured to, or operable to support a means for outputting an indication that enables the second cell for uplink transmission switching in accordance with a first mode, the first mode associated with uplink transmissions via a single transmit chain. In some examples, the control signaling component 1150 is capable of, configured to, or operable to support a means for outputting third control signaling via the first carrier, where the third control signaling schedules the UE to transmit uplink signaling via the second carrier in accordance with the first mode.

In some examples, the transmission switching indication component 1155 is capable of, configured to, or operable to support a means for outputting an indication that enables the second cell for uplink transmission switching in accordance with a second mode, the second mode associated with uplink transmissions via at least two transmit chains. In some examples, the control signaling component 1150 is capable of, configured to, or operable to support a means for outputting third control signaling via the first carrier, where the third control signaling schedules the UE to simultaneously transmit uplink signaling via the first carrier and the second carrier in accordance with the second mode.

In some examples, the FDD component 1160 is capable of, configured to, or operable to support a means for outputting third control signaling via the first carrier, where the second control signaling schedules a first time domain resource for the UE to transmit uplink signaling via the second carrier using FDD. In some examples, the FDD component 1160 is capable of, configured to, or operable to support a means for outputting fourth control signaling via the first carrier, where the fourth control signaling schedules the first time domain resource for the UE to receive downlink signaling via the first carrier using the FDD.

In some examples, the SSB component 1165 is capable of, configured to, or operable to support a means for outputting, via the second carrier, at least one SSB of a set of SSBs associated with the second carrier. In some examples, the SSB component 1165 is capable of, configured to, or operable to support a means for obtaining a report associated with the second carrier, where the report is indicative of one or more metrics associated with a quality of the second carrier, and where the one or more metrics are based on one or more measurements of the at least one SSB.

In some examples, the control signaling component 1150 is capable of, configured to, or operable to support a means for outputting, via the first cell in response to the report, fourth control signaling that indicates a transmit power for uplink communication via the second carrier. In some examples, the report is obtained via the first carrier or the second carrier. In some examples, the one or more metrics include a timing position metric, or a pathloss metric, or both.

In some examples, to support outputting the second control signaling, the SSB component 1165 is capable of, configured to, or operable to support a means for outputting, via the first carrier, an indication of one or more parameters associated with the set of SSBs, where outputting the at least one SSB associated with the second carrier is in accordance with the one or more parameters.

In some examples, the one or more parameters include a position parameter that indicates a time domain position of one or more SSBs within the set of SSBs, a periodicity parameter that indicates a periodicity of one or more SSBs within the set of SSBs, a power parameter that indicates a transmit power associated with one or more SSBs within the set of SSBs, or a subcarrier spacing parameter that indicates a subcarrier spacing of one or more SSBs within the set of SSBs, or any combination thereof.

In some examples, to support outputting the second control signaling, the pattern indication component 1170 is capable of, configured to, or operable to support a means for outputting, via the first carrier, an indication of a pattern associated with transmission of uplink signaling via the second carrier using TDD.

In some examples, to support outputting the second control signaling, the SIB component 1175 is capable of, configured to, or operable to support a means for outputting the second control signaling via the first carrier or the second carrier, where the second control signaling includes a system information block.

In some examples, the second control signaling lacks any indication of any SUL configuration that is usable by the UE for uplink communication within the second cell.

Figure 12:
FIG. 12 shows a diagram of a system including a device that supports CA for UL cells in accordance with one or more aspects of the present disclosure.

FIG. 12 shows a diagram of a system 1200 including a device 1205 that supports CA for UL cells in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting CA for UL cells). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 is capable of, configured to, or operable to support a means for outputting, to a UE, first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and the network entity. The communications manager 1220 is capable of, configured to, or operable to support a means for outputting, to the UE, second control signaling for a second cell, where the second control signaling indicates a second bandwidth part that is usable by the UE for uplink communication within the second cell, where the second control signaling lacks any indication of any bandwidth part is usable by the UE for downlink communication within the second cell, and where the second bandwidth part is within a second carrier of the set of carriers.

By including or configuring the communications manager 1220 in accordance with examples as described herein, the device 1205 may support techniques for improved communication reliability, reduced latency, improved user experience related to reduced processing, and more efficient utilization of communication resources.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of CA for UL cells as described herein, or the at least one processor 1235 and the at least one memory 1225 may be otherwise configured to, individually or collectively, perform or support such operations.

FIG. 13 shows a flowchart illustrating a method 1300 that supports CA for UL cells in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and a network entity. The operations of block 1305 may be performed in accordance with examples as disclosed herein. In some examples, aspects of the operations of 1305 may be performed by a first cell component 725 as described with reference to FIG. 7.

At 1310, the method may include receiving second control signaling for a second cell, where the second control signaling indicates a second bandwidth part that is usable by the UE for uplink communication within the second cell, where the second control signaling lacks any indication of any bandwidth part that usable by the UE for downlink communication within the second cell, and where the second bandwidth part is within a second carrier of the set of carriers. The operations of block 1310 may be performed in accordance with examples as disclosed herein. In some examples, aspects of the operations of 1310 may be performed by a second cell component 730 as described with reference to FIG. 7.

At 1315, the method may include monitoring the first carrier for third control signaling associated with the second cell, where monitoring the first carrier for the third control signaling is based on the second control signaling lacking any indication of any bandwidth part that is usable by the UE for downlink communication within the second cell. The operations of block 1315 may be performed in accordance with examples as disclosed herein. In some examples, aspects of the operations of 1315 may be performed by a first carrier component 735 as described with reference to FIG. 7.

FIG. 14 shows a flowchart illustrating a method 1400 that supports CA for UL cells in accordance with aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include outputting, to a UE, first control signaling for a first cell, where the first control signaling indicates one or more first bandwidth parts that are usable by the UE for uplink communication and downlink communication within the first cell, and where the one or more first bandwidth parts are within a first carrier of a set of carriers for CA communication between the UE and the network entity. The operations of block 1405 may be performed in accordance with examples as disclosed herein. In some examples, aspects of the operations of 1405 may be performed by a first bandwidth part component 1125 as described with reference to FIG. 11.

At 1410, the method may include outputting, to the UE, second control signaling for a second cell, where the second control signaling indicates a second bandwidth part that is usable by the UE for uplink communication within the second cell, where the second control signaling lacks any indication of any bandwidth part is usable by the UE for downlink communication within the second cell, and where the second bandwidth part is within a second carrier of the set of carriers. The operations of block 1410 may be performed in accordance with examples as disclosed herein. In some examples, aspects of the operations of 1410 may be performed by a second bandwidth part component 1130 as described with reference to FIG. 11.

The following provides an overview of aspects of the present disclosure:

Aspect 1: A method for wireless communication by a UE, comprising: receiving first control signaling for a first cell, wherein the first control signaling indicates one or more first bandwidth parts that are usable by the UE for uplink communication and downlink communication within the first cell, and wherein the one or more first bandwidth parts are within a first carrier of a set of carriers for CA communication between the UE and a network entity; receiving second control signaling for a second cell, wherein the second control signaling indicates a second bandwidth part that is usable by the UE for uplink communication within the second cell, wherein the second control signaling lacks any indication of any bandwidth part that usable by the UE for downlink communication within the second cell, and wherein the second bandwidth part is within a second carrier of the set of carriers; and monitoring the first carrier for third control signaling associated with the second cell, wherein monitoring the first carrier for the third control signaling is based at least in part on the second control signaling lacking any indication of any bandwidth part that is usable by the UE for downlink communication within the second cell.

Aspect 2: The method of aspect 1, further comprising: monitoring one or more PDCCH candidates of a CORESET associated with the first cell, wherein monitoring the one or more PDCCH candidates is based at least in part on the second control signaling lacking any indication of any bandwidth part that is usable by the UE for downlink communication within the second cell; and receiving, via the one or more PDCCH candidates, DCI scheduling the UE to transmit uplink signaling via the second bandwidth part associated with the second cell.

Aspect 3: The method of aspect 1, further comprising: monitoring one or more PDCCH candidates of a CORESET associated with the second cell, wherein monitoring the one or more PDCCH candidates is based at least in part on the second control signaling lacking any indication of any bandwidth part that usable by the UE for downlink communication; and receiving, via the one or more PDCCH candidates, DCI scheduling the UE to transmit uplink signaling via the second bandwidth part associated with the second cell within the second cell.

Aspect 4: The method of any of aspects 1 through 3, further comprising: receiving, via the first carrier, the third control signaling associated with the second cell, wherein the third control signaling comprises a RRC message or a MAC-CE.

Aspect 5: The method of aspect 4, wherein the third control signaling indicates for the UE to activate or deactivate the second cell for CA communication between the UE and the network entity.

Aspect 6: The method of aspect 4, wherein the third control signaling indicates for the UE to release the second cell.

Aspect 7: The method of any of aspects 1 through 6, further comprising: receiving an indication that enables the second cell for uplink transmission switching in accordance with a first mode, the first mode associated with uplink transmissions via a single transmit chain; and receiving the third control signaling via the first carrier, wherein the third control signaling schedules the UE to transmit uplink signaling via the second carrier in accordance with the first mode.

Aspect 8: The method of any of aspects 1 through 6, further comprising: receiving an indication that enables the second cell for uplink transmission switching in accordance with a second mode, the second mode associated with uplink transmissions via at least two transmit chains; and receiving the third control signaling via the first carrier, wherein the third control signaling schedules the UE to simultaneously transmit uplink signaling via the first carrier and the second carrier in accordance with the second mode.

Aspect 9: The method of any of aspects 1 through 8, further comprising: receiving the third control signaling via the first carrier, wherein the third control signaling schedules a first time domain resource for the UE to transmit uplink signaling via the second carrier using FDD; and receiving fourth control signaling via the first carrier, wherein the fourth control signaling schedules the first time domain resource for the UE to receive downlink signaling via the first carrier using FDD.

Aspect 10: The method of any of aspects 1 through 9, further comprising: monitoring the second carrier for a set of SSBs associated with the second carrier, wherein monitoring the second carrier for the set of SSBs is based at least in part on the second control signaling lacking any indication of any bandwidth part that is usable by the UE for downlink communication within the second cell; and receiving, via the second carrier, at least one SSB of the set of SSBs.

Aspect 11: The method of aspect 10, further comprising: transmitting a report that is indicative of one or more metrics associated with a quality of the second carrier, wherein the one or more metrics are based at least in part on one or more measurements of the at least one SSB.

Aspect 12: The method of aspect 11, further comprising: receiving, via the first cell in response to the report, fourth control signaling that indicates a transmit power for uplink communication via the second carrier.

Aspect 13: The method of any of aspects 11 through 12, wherein the report is transmitted via the first carrier or the second carrier.

Aspect 14: The method of any of aspects 11 through 13, wherein the one or more metrics comprise a timing position metric, or a pathloss metric, or both.

Aspect 15: The method of any of aspects 10 through 14, wherein receiving the second control signaling comprises: receiving, via the first carrier, an indication of one or more parameters associated with the set of SSBs, wherein monitoring for the set of SSBs associated with the second carrier is in accordance with the one or more parameters.

Aspect 16: The method of aspect 15, wherein the one or more parameters comprise a position parameter that indicates a time domain position of one or more SSBs within the set of SSBs, a periodicity parameter that indicates a periodicity of one or more SSBs within the set of SSBs, a power parameter that indicates a transmit power associated with one or more SSBs within the set of SSBs, or a subcarrier spacing parameter that indicates a subcarrier spacing of one or more SSBs within the set of SSBs, or any combination thereof.

Aspect 17: The method of any of aspects 1 through 16, wherein receiving the second control signaling comprises: receiving, via the first carrier, an indication of a pattern associated with uplink communication via the second carrier using TDD.

Aspect 18: The method of any of aspects 1 through 17, wherein receiving the second control signaling comprises: receiving the second control signaling via the first carrier or the second carrier, wherein the second control signaling comprises a SIB.

Aspect 19: The method of any of aspects 1 through 18, wherein the second control signaling lacks any indication of any SUL configuration that is usable by the UE for uplink communication within the second cell.

Aspect 20: A method for wireless communication by a network entity, comprising: outputting, to a UE, first control signaling for a first cell, wherein the first control signaling indicates one or more first bandwidth parts that are usable by the UE for uplink communication and downlink communication within the first cell, and wherein the one or more first bandwidth parts are within a first carrier of a set of carriers for CA communication between the UE and the network entity; and outputting, to the UE, second control signaling for a second cell, wherein the second control signaling indicates a second bandwidth part that is usable by the UE for uplink communication within the second cell, wherein the second control signaling lacks any indication of any bandwidth part is usable by the UE for downlink communication within the second cell, and wherein the second bandwidth part is within a second carrier of the set of carriers.

Aspect 21: The method of aspect 20, further comprising: outputting, to a second UE, third control signaling for the second cell, wherein the third control signaling indicates that the second bandwidth part is usable by the second UE for uplink communication and downlink communication within the second cell.

Aspect 22: The method of aspect 20, further comprising: outputting, to the UE via the first cell and after outputting the second control signaling, third control signaling for the second cell, wherein the third control signaling indicates a change of the second bandwidth part from being usable by the UE for uplink communication to being usable by the UE for downlink communication, or indicates at least one additional bandwidth part that is usable by the UE for downlink or uplink communications.

Aspect 23: The method of any of aspects 20 through 22, further comprising: outputting, via one or more PDCCH candidates associated with the first cell, DCI scheduling the UE to transmit uplink signaling via the second bandwidth part associated with the second cell, wherein outputting the DCI via the one or more PDCCH candidates is based at least in part on the second control signaling lacking any indication of any bandwidth part that is usable by the UE for downlink communication within the second cell.

Aspect 24: The method of any of aspects 20 through 22, further comprising: outputting, via one or more PDCCH candidates associated with the second cell, DCI scheduling the UE to transmit uplink signaling via the second bandwidth part associated with the second cell, wherein outputting the DCI via the one or more PDCCH candidates is based at least in part on the second control signaling lacking any indication of any bandwidth part that is usable by the UE for downlink communication within the second cell.

Aspect 25: The method of any of aspects 20 through 24, further comprising: outputting, via the first carrier, third control signaling associated with the second cell, wherein outputting the third control signaling via the first carrier is based at least in part on the second control signaling lacking any indication of any bandwidth part that is usable by the UE for downlink communication within the second cell.

Aspect 26: The method of aspect 25, wherein the third control signaling indicates for the UE to activate the second cell for CA communication between the UE and the network entity, to deactivate the second cell for CA communication between the UE and the network entity, or to release the second cell.

Aspect 27: The method of any of aspects 20 through 26, further comprising: outputting an indication that enables the second cell for uplink transmission switching in accordance with a first mode, the first mode associated with uplink transmissions via a single transmit chain; and outputting third control signaling via the first carrier, wherein the third control signaling schedules the UE to transmit uplink signaling via the second carrier in accordance with the first mode.

Aspect 28: The method of any of aspects 20 through 26, further comprising: outputting an indication that enables the second cell for uplink transmission switching in accordance with a second mode, the second mode associated with uplink transmissions via at least two transmit chains; and outputting third control signaling via the first carrier, wherein the third control signaling schedules the UE to simultaneously transmit uplink signaling via the first carrier and the second carrier in accordance with the second mode.

Aspect 29: The method of any of aspects 20 through 28, further comprising: outputting third control signaling via the first carrier, wherein the second control signaling schedules a first time domain resource for the UE to transmit uplink signaling via the second carrier using FDD; and outputting fourth control signaling via the first carrier, wherein the fourth control signaling schedules the first time domain resource for the UE to receive downlink signaling via the first carrier using the FDD.

Aspect 30: The method of any of aspects 20 through 29, further comprising: outputting, via the second carrier, at least one SSB of a set of SSBs associated with the second carrier; and obtaining a report associated with the second carrier, wherein the report is indicative of one or more metrics associated with a quality of the second carrier, and wherein the one or more metrics are based at least in part on one or more measurements of the at least one SSB.

Aspect 31: The method of aspect 30, further comprising: outputting, via the first cell in response to the report, fourth control signaling that indicates a transmit power for uplink communication via the second carrier.

Aspect 32: The method of any of aspects 30 through 31, wherein the report is obtained via the first carrier or the second carrier.

Aspect 33: The method of any of aspects 30 through 32, wherein the one or more metrics comprise a timing position metric, or a pathloss metric, or both.

Aspect 34: The method of any of aspects 30 through 33, wherein outputting the second control signaling comprises: outputting, via the first carrier, an indication of one or more parameters associated with the set of SSBs, wherein outputting the at least one SSB associated with the second carrier is in accordance with the one or more parameters.

Aspect 35: The method of aspect 34, wherein the one or more parameters comprise a position parameter that indicates a time domain position of one or more SSBs within the set of SSBs, a periodicity parameter that indicates a periodicity of one or more SSBs within the set of SSBs, a power parameter that indicates a transmit power associated with one or more SSBs within the set of SSBs, or a subcarrier spacing parameter that indicates a subcarrier spacing of one or more SSBs within the set of SSBs, or any combination thereof.

Aspect 36: The method of any of aspects 20 through 35, wherein outputting the second control signaling comprises: outputting, via the first carrier, an indication of a pattern associated with transmission of uplink signaling via the second carrier using TDD.

Aspect 37: The method of any of aspects 20 through 36, wherein outputting the second control signaling comprises: outputting the second control signaling via the first carrier or the second carrier, wherein the second control signaling comprises a SIB.

Aspect 38: The method of any of aspects 20 through 37, wherein the second control signaling lacks any indication of any SUL configuration that is usable by the UE for uplink communication within the second cell.

Aspect 39: A UE for wireless communication, comprising one or more memories storing processor-executable code, and one or more processors coupled with the one or more memories and individually or collectively operable to execute the code to cause the UE to perform a method of any of aspects 1 through 19.

Aspect 40: A UE for wireless communication, comprising at least one means for performing a method of any of aspects 1 through 19.

Aspect 41: A non-transitory computer-readable medium storing code for wireless communication, the code comprising instructions executable by one or more processors to perform a method of any of aspects 1 through 19.

Aspect 42: A network entity for wireless communication, comprising one or more memories storing processor-executable code, and one or more processors coupled with the one or more memories and individually or collectively operable to execute the code to cause the network entity to perform a method of any of aspects 20 through 38.

Aspect 43: A network entity for wireless communication, comprising at least one means for performing a method of any of aspects 20 through 38.

Aspect 44: A non-transitory computer-readable medium storing code for wireless communication, the code comprising instructions executable by one or more processors to perform a method of any of aspects 20 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components." Also, as used herein, the phrase "a set" shall be construed as including the possibility of a set with one member. That is, the phrase "a set" shall be construed in the same manner as "one or more."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive first control signaling for a first cell, wherein the first control signaling indicates one or more first bandwidth parts that are usable by the UE for uplink communication and downlink communication within the first cell, and wherein the one or more first bandwidth parts are within a first carrier of a set of carriers for carrier aggregation communication between the UE and a network entity;
receive second control signaling for a second cell, wherein the second control signaling indicates a second bandwidth part that is usable by the UE for uplink communication within the second cell, wherein the second control signaling lacks any indication of any bandwidth part that usable by the UE for downlink communication within the second cell, and wherein the second bandwidth part is within a second carrier of the set of carriers; and
monitor the first carrier for third control signaling associated with the second cell, wherein monitoring the first carrier for the third control signaling is based at least in part on the second control signaling lacking any indication of any bandwidth part that is usable by the UE for downlink communication within the second cell.

2. The UE of claim 1, wherein the one or more processors are individually or collectively further operable to execute the code to cause the UE to:
monitor one or more physical downlink control channel candidates of a control resource set associated with the first cell, wherein monitoring the one or more physical downlink control channel candidates is based at least in part on the second control signaling lacking any indication of any bandwidth part that is usable by the UE for downlink communication within the second cell; and
receive, via the one or more physical downlink control channel candidates, downlink control information scheduling the UE to transmit uplink signaling via the second bandwidth part associated with the second cell.

3. The UE of claim 1, wherein the one or more processors are individually or collectively further operable to execute the code to cause the UE to:
monitor one or more physical downlink control channel candidates of a control resource set associated with the second cell, wherein monitoring the one or more physical downlink control channel candidates is based at least in part on the second control signaling lacking any indication of any bandwidth part that usable by the UE for downlink communication; and
receive, via the one or more physical downlink control channel candidates, downlink control information scheduling the UE to transmit uplink signaling via the second bandwidth part associated with the second cell within the second cell.

4. The UE of claim 1, wherein the one or more processors are individually or collectively further operable to execute the code to cause the UE to:
receive, via the first carrier, the third control signaling associated with the second cell, wherein the third control signaling comprises a radio resource control message or a medium access control-control element.

5. The UE of claim 4, wherein the third control signaling indicates for the UE to activate or deactivate the second cell for carrier aggregation communication between the UE and the network entity.

6. The UE of claim 4, wherein the third control signaling indicates for the UE to release the second cell.

7. The UE of claim 1, wherein the one or more processors are individually or collectively further operable to execute the code to cause the UE to:
receive an indication that enables the second cell for uplink transmission switching in accordance with a first mode, the first mode associated with uplink transmissions via a single transmit chain; and
receive the third control signaling via the first carrier, wherein the third control signaling schedules the UE to transmit uplink signaling via the second carrier in accordance with the first mode.

8. The UE of claim 1, wherein the one or more processors are individually or collectively further operable to execute the code to cause the UE to:
receive an indication that enables the second cell for uplink transmission switching in accordance with a second mode, the second mode associated with uplink transmissions via at least two transmit chains; and
receive the third control signaling via the first carrier, wherein the third control signaling schedules the UE to simultaneously transmit uplink signaling via the first carrier and the second carrier in accordance with the second mode.

9. The UE of claim 1, wherein the one or more processors are individually or collectively further operable to execute the code to cause the UE to:
receive the third control signaling via the first carrier, wherein the third control signaling schedules a first time domain resource for the UE to transmit uplink signaling via the second carrier using frequency division duplexing; and receive fourth control signaling via the first carrier, wherein the fourth control signaling schedules the first time domain resource for the UE to receive downlink signaling via the first carrier using the frequency division duplexing.

10. The UE of claim 1, wherein the one or more processors are individually or collectively further operable to execute the code to cause the UE to:

monitor the second carrier for a set of synchronization signal blocks associated with the second carrier, wherein monitoring the second carrier for the set of synchronization signal blocks is based at least in part on the second control signaling lacking any indication of any bandwidth part that is usable by the UE for downlink communication within the second cell; and receive, via the second carrier, at least one synchronization signal block of the set of synchronization signal blocks.

11. The UE of claim 10, wherein the one or more processors are individually or collectively further operable to execute the code to cause the UE to:

transmit a report that is indicative of one or more metrics associated with a quality of the second carrier, wherein the one or more metrics are based at least in part on one or more measurements of the at least one synchronization signal block.

12. The UE of claim 11, wherein the one or more processors are individually or collectively further operable to execute the code to cause the UE to:

receive, via the first cell in response to the report, fourth control signaling that indicates a transmit power for uplink communication via the second carrier.

13. The UE of claim 11, wherein the report is transmitted via the first carrier or the second carrier.

14. The UE of claim 11, wherein the one or more metrics comprise a timing position metric, or a pathloss metric, or both.

15. The UE of claim 10, wherein, to receive the second control signaling, the one or more processors are individually or collectively operable to execute the code to cause the UE to:

receive, via the first carrier, an indication of one or more parameters associated with the set of synchronization signal blocks, wherein monitoring for the set of synchronization signal blocks associated with the second carrier is in accordance with the one or more parameters.

16. The UE of claim 15, wherein the one or more parameters comprise a position parameter that indicates a time domain position of one or more synchronization signal blocks within the set of synchronization signal blocks, a periodicity parameter that indicates a periodicity of one or more synchronization signal blocks within the set of synchronization signal blocks, a power parameter that indicates a transmit power associated with one or more synchronization signal blocks within the set of synchronization signal blocks, or a subcarrier spacing parameter that indicates a subcarrier spacing of one or more synchronization signal blocks within the set of synchronization signal blocks, or any combination thereof.

17. The UE of claim 1, wherein, to receive the second control signaling, the one or more processors are individually or collectively operable to execute the code to cause the UE to:

receive, via the first carrier, an indication of a pattern associated with uplink communication via the second carrier using time division duplexing.

18. The UE of claim 1, wherein, to receive the second control signaling, the one or more processors are individually or collectively operable to execute the code to cause the UE to:

receive the second control signaling via the first carrier or the second carrier, wherein the second control signaling comprises a system information block.

19. The UE of claim 1, wherein the second control signaling lacks any indication of any supplementary uplink configuration that is usable by the UE for uplink communication within the second cell.

20. A network entity, comprising:

one or more memories storing processor-executable code; and one or more processors coupled with the one or more memories and individually or collectively operable to execute the code to cause the network entity to:

output, to a user equipment (UE), first control signaling for a first cell, wherein the first control signaling indicates one or more first bandwidth parts that are usable by the UE for uplink communication and downlink communication within the first cell, and wherein the one or more first bandwidth parts are within a first carrier of a set of carriers for carrier aggregation communication between the UE and the network entity; and output, to the UE, second control signaling for a second cell, wherein the second control signaling indicates a second bandwidth part that is usable by the UE for uplink communication within the second cell, wherein the second control signaling lacks any indication of any bandwidth part is usable by the UE for downlink communication within the second cell, and wherein the second bandwidth part is within a second carrier of the set of carriers.

21. The network entity of claim 20, wherein the one or more processors are individually or collectively further operable to execute the code to cause the network entity to:

output, to a second UE, third control signaling for the second cell, wherein the third control signaling indicates that the second carrier is usable by the second UE for uplink communication and downlink communication within the second cell.

22. The network entity of claim 20, wherein the one or more processors are individually or collectively further operable to execute the code to cause the network entity to:

output, to the UE via the first cell and after outputting the second control signaling, third control signaling for the second cell, wherein the third control signaling indicates a change of the second bandwidth part from being usable by the UE for uplink communication to being usable by the UE for downlink communication or indicates at least one additional bandwidth part that is usable by the UE for downlink or uplink communications.

23. The network entity of claim 20, wherein the one or more processors are individually or collectively further operable to execute the code to cause the network entity to:

output, via one or more physical downlink control channel candidates associate with the first cell, downlink control information scheduling the UE to transmit uplink signaling via the second bandwidth part associated with the second cell, wherein outputting the downlink control information via the one or more physical downlink control channel candidates is based at least in part on the second control signaling lacking any indication of any bandwidth part that is usable by the UE for downlink communication within the second cell.

24. The network entity of claim 20, wherein the one or more processors are individually or collectively further operable to execute the code to cause the network entity to:

output, via one or more physical downlink control channel candidates associate with the second cell, downlink control information scheduling the UE to transmit uplink signaling via the second bandwidth part associated with the second cell, wherein outputting the downlink control information via the one or more physical downlink control channel candidates is based at least in part on the second control signaling lacking any indication of any bandwidth part that is usable by the UE for downlink communication within the second cell.

25. The network entity of claim 20, wherein the one or more processors are individually or collectively further operable to execute the code to cause the network entity to:

output, via the first carrier, third control signaling associated with the second cell, wherein outputting the third control signaling via the first carrier is based at least in part on the second control signaling lacking any indication of any bandwidth part that is usable by the UE for downlink communication within the second cell.

26. The network entity of claim 20, wherein the one or more processors are individually or collectively further operable to execute the code to cause the network entity to:

output an indication that enables the second cell for uplink transmission switching in accordance with a first mode, the first mode associated with uplink transmissions via a single transmit chain; and output third control signaling via the first carrier, wherein the third control signaling schedules the UE to transmit uplink signaling via the second carrier in accordance with the first mode.

27. The network entity of claim 20, wherein the one or more processors are individually or collectively further operable to execute the code to cause the network entity to:

output an indication that enables the second cell for uplink transmission switching in accordance with a second mode, the second mode associated with uplink transmissions via at least two transmit chains; and output third control signaling via the first carrier, wherein the third control signaling schedules the UE to simultaneously transmit uplink signaling via the first carrier and the second carrier in accordance with the second mode.

28. The network entity of claim 20, wherein the one or more processors are individually or collectively further operable to execute the code to cause the network entity to:

output third control signaling via the first carrier, wherein the second control signaling schedules a first time domain resource for the UE to transmit uplink signaling via the second carrier using frequency division duplexing; and output fourth control signaling via the first carrier, wherein the fourth control signaling schedules the first time domain resource for the UE to receive downlink signaling via the first carrier using the frequency division duplexing.

29. A method for wireless communication by a user equipment (UE), comprising:

receiving first control signaling for a first cell, wherein the first control signaling indicates one or more first bandwidth parts that are usable by the UE for uplink communication and downlink communication within the first cell, and wherein the one or more first bandwidth parts are within a first carrier of a set of carriers for carrier aggregation communication between the UE and a network entity;

receiving second control signaling for a second cell, wherein the second control signaling indicates a second bandwidth part that is usable by the UE for uplink communication within the second cell, wherein the second control signaling lacks any indication of any bandwidth part that usable by the UE for downlink communication within the second cell, and wherein the second bandwidth part is within a second carrier of the set of carriers; and monitoring the first carrier for third control signaling associated with the second cell, wherein monitoring the first carrier for the third control signaling is based at least in part on the second control signaling lacking any indication of any bandwidth part that is usable by the UE for downlink communication within the second cell.

30. A method for wireless communication by a network entity, comprising:

outputting, to a user equipment (UE), first control signaling for a first cell, wherein the first control signaling indicates one or more first bandwidth parts that are usable by the UE for uplink communication and downlink communication within the first cell, and wherein the one or more first bandwidth parts are within a first carrier of a set of carriers for carrier aggregation communication between the UE and the network entity; and outputting, to the UE, second control signaling for a second cell, wherein the second control signaling indicates a second bandwidth part that is usable by the UE for uplink communication within the second cell, wherein the second control signaling lacks any indication of any bandwidth part is usable by the UE for downlink communication within the second cell, and wherein the second bandwidth part is within a second carrier of the set of carriers.

* * * * *